United States Patent
McNamee

(10) Patent No.: US 9,844,706 B2
(45) Date of Patent: Dec. 19, 2017

(54) INFLATABLE GAME BALL PANEL CONSTRUCTION

(71) Applicant: NIKE, Inc., Beaverton, OR (US)

(72) Inventor: Mark McNamee, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/447,188

(22) Filed: Mar. 2, 2017

(65) Prior Publication Data
US 2017/0173405 A1    Jun. 22, 2017

Related U.S. Application Data

(62) Division of application No. 13/778,170, filed on Feb. 27, 2013, now Pat. No. 9,623,289.

(51) Int. Cl.
*A63B 41/08* (2006.01)
*A63B 41/02* (2006.01)

(52) U.S. Cl.
CPC .............. *A63B 41/08* (2013.01); *A63B 41/02* (2013.01)

(58) Field of Classification Search
CPC .......... A63B 41/08; A63B 41/02; A63B 41/10
See application file for complete search history.

(56) References Cited

U.S. PATENT DOCUMENTS

| | | | | |
|---|---|---|---|---|
| 1,187,029 A * | 6/1916 | Beebout | | A63B 41/08 156/213 |
| 1,439,456 A * | 12/1922 | Turner | | A63B 41/085 473/603 |
| 5,997,422 A * | 12/1999 | Cooper | | A63B 41/08 473/599 |
| 6,348,018 B1 * | 2/2002 | Ou | | A63B 41/08 473/143 |
| 6,503,162 B1 * | 1/2003 | Shishido | | A63B 41/08 473/599 |
| 6,517,471 B2 * | 2/2003 | Chen | | A63B 41/08 446/220 |
| 6,726,583 B1 * | 4/2004 | Lai | | A63B 41/10 473/599 |
| 9,623,289 B2 * | 4/2017 | McNamee | | A63B 41/08 |
| 2002/0086749 A1 * | 7/2002 | Ou | | A63B 41/00 473/604 |
| 2002/0103047 A1 * | 8/2002 | Ou | | A63B 41/08 473/603 |

(Continued)

*Primary Examiner* — Steven Wong
(74) *Attorney, Agent, or Firm* — Quinn IP Law

(57) ABSTRACT

An inflatable game ball includes a cover formed from a plurality of panel segments attached along peripheral edges. Each panel segment an outer panel portion, having a first shape and a first size, and an inner panel portion, having the first shape and a second size, smaller than the first size. The outer panel portion is joined with the inner panel portion, such that peripheral edges of the outer panel portion are aligned, and parallel, with peripheral edges of the inner panel portion. An inflatable bladder is disposed within the cover and movable between deflated and fully-inflated conditions. When the inflatable bladder is deflated, an interior surface of the outer panel portions is separated from a top surface of the inner panel portions by a first distance. When the inflatable bladder is fully-inflated, the interior surface is in contact with the top surface of the inner panel portions.

13 Claims, 19 Drawing Sheets

(56) References Cited

U.S. PATENT DOCUMENTS

| | | | | |
|---|---|---|---|---|
| 2003/0073527 A1* | 4/2003 | Ou Chen | ............... | A63B 41/00 473/604 |
| 2003/0228946 A1* | 12/2003 | Chan | ...................... | A63B 41/00 473/604 |
| 2004/0018902 A1* | 1/2004 | Hu | ......................... | A63B 41/08 473/604 |
| 2005/0277499 A1* | 12/2005 | Tang | ..................... | A63B 41/085 473/604 |
| 2006/0046880 A1* | 3/2006 | Tang | ..................... | A63B 41/08 473/604 |
| 2010/0167850 A1* | 7/2010 | Lin | ......................... | A63B 41/00 473/605 |
| 2010/0248873 A1* | 9/2010 | Cooper | .................. | A63B 41/08 473/599 |

* cited by examiner

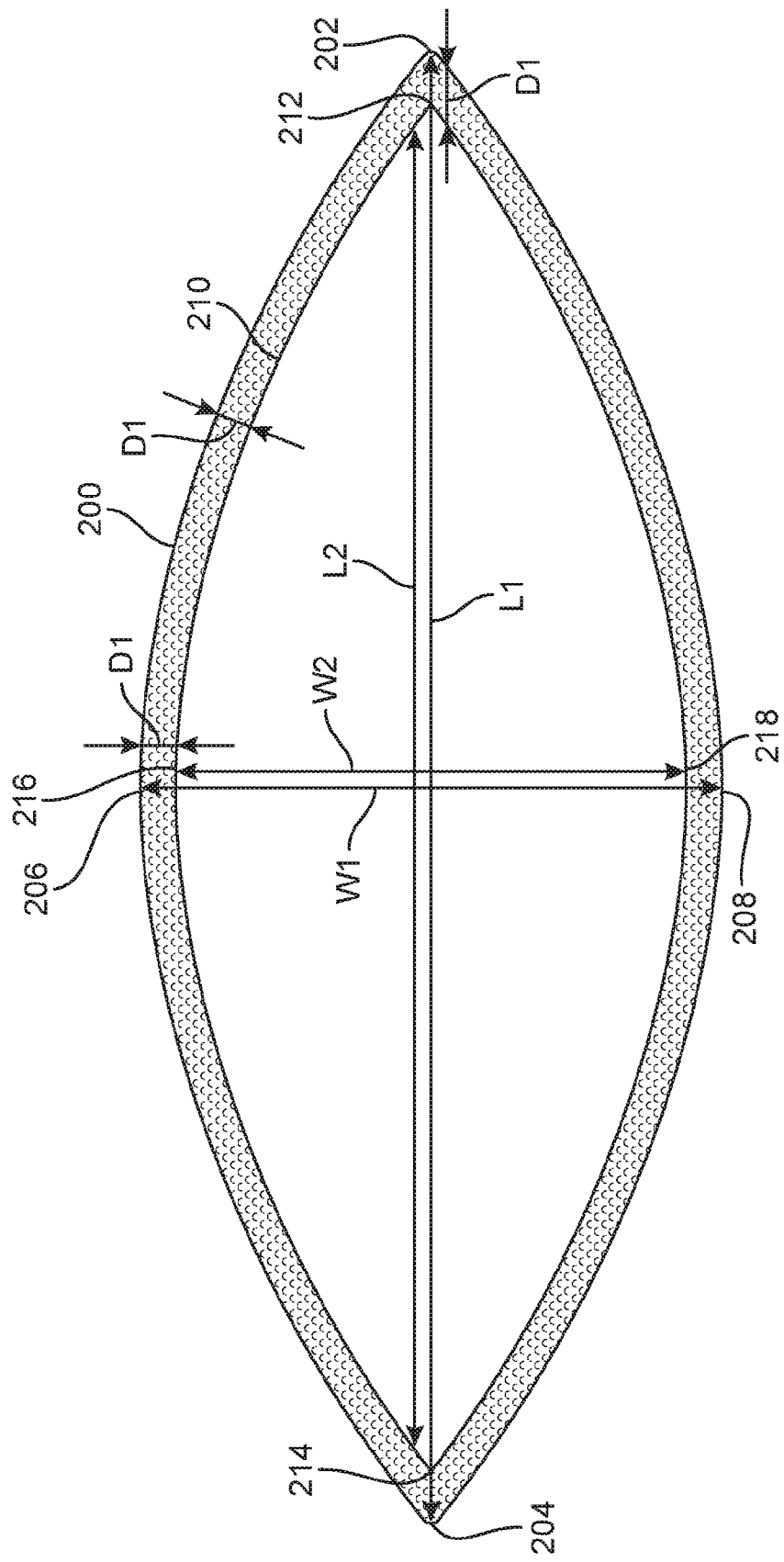

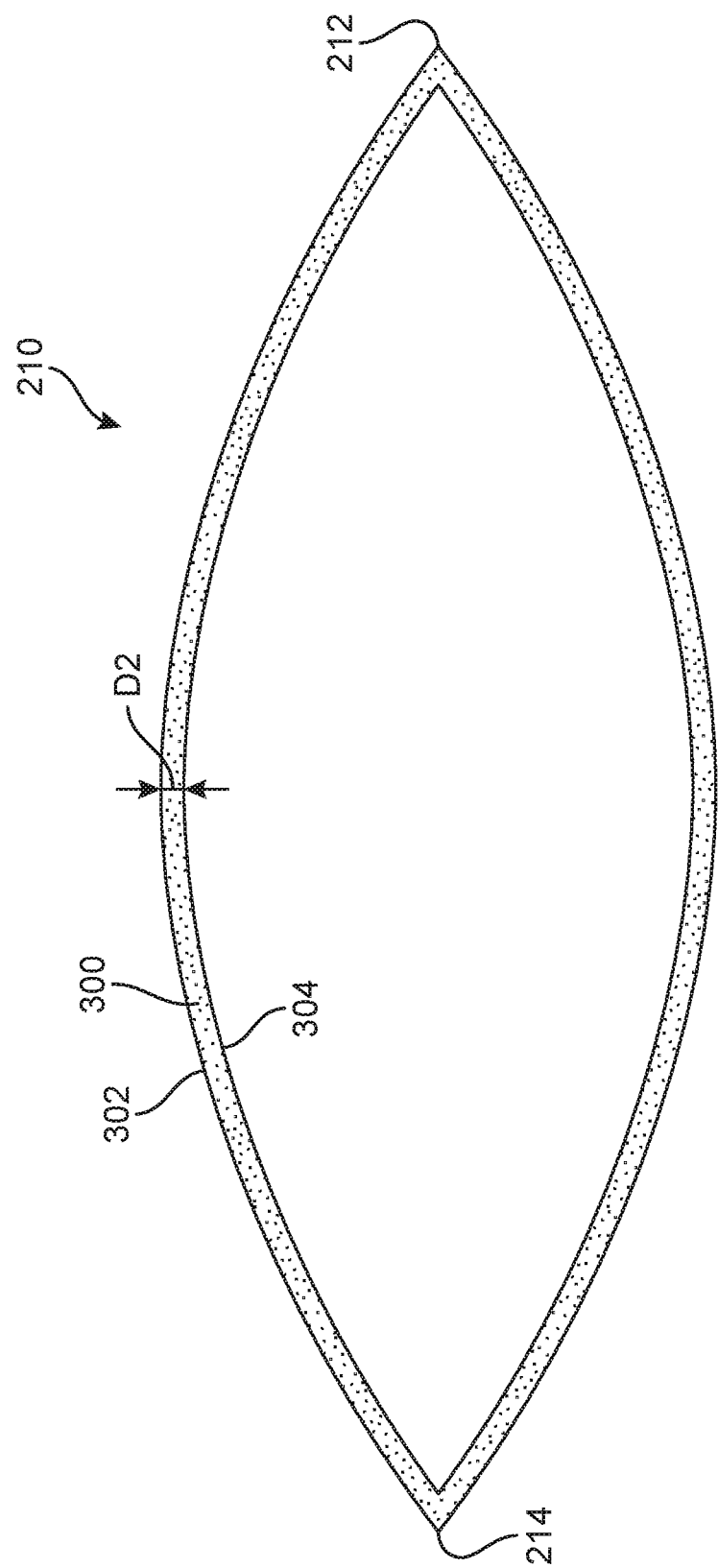

US 9,844,706 B2

INFLATABLE GAME BALL PANEL CONSTRUCTION

CROSS-REFERENCE TO RELATED APPLICATIONS

This application is a divisional of application Ser. No. 13/778,170, filed Feb. 27, 2013, which is hereby incorporated by reference in its entirety.

INTRODUCTION

The present disclosure relates generally to inflatable game balls, and more specifically, to inflatable game ball panel construction using different sized panel layers. Inflatable game balls, including basketballs, footballs, soccer balls, and volleyballs, may include an outside cover with an inflatable bladder on the inside. When the inflatable bladder fills with air, the outside cover may stretch to some degree to reach a fully inflated condition. In the case of footballs made of natural leather or hide, the outside cover can exhibit variations in the amount of stretching due to inherent differences in the degree or amount of stretch between different pieces of leather. As a result, two footballs having covers made of identically sized pieces may have slightly different dimensions when fully inflated to the same internal pressure.

SUMMARY

An inflatable game ball, or game ball assembly, is provided. The inflatable game ball includes a cover formed from a plurality of panel segments that are attached along peripheral edges. Each panel segment of the cover includes an outer panel portion and an inner panel portion.

The outer panel portion having a first shape and a first size, and the inner panel portion having the first shape and a second size. The second size of the inner panel portion is smaller than the first size of the outer panel portion. The outer panel portion is joined with the inner panel portion, such that a peripheral edge of the outer panel portion is aligned, and parallel, with a peripheral edge of the inner panel portion.

An inflatable bladder is disposed within the cover, the inflatable bladder being configured to move between a deflated condition and a fully inflated condition. When the inflatable bladder is in the deflated condition, an interior surface of the outer panel portions of the cover is separated a first distance apart from a top surface of the inner panel portions of the cover; and, when the inflatable bladder is in the fully inflated condition, the interior surface of the outer panel portions of the cover is in contact with the top surface of the inner panel portions of the cover.

The above features and advantages, and other features and advantages, of the present invention are readily apparent from the following detailed description of some of the best modes and other embodiments for carrying out the invention, which is defined solely by the appended claims, when taken in connection with the accompanying drawings. The components in the figures are not necessarily to scale, emphasis instead being placed upon illustrating the principles of the disclosure. Moreover, in the figures, like reference numerals designate corresponding parts throughout the different views.

BRIEF DESCRIPTION OF THE DRAWINGS

FIG. 3A is a top plan view of exemplary embodiments of panel layers having different sizes for use in constructing a football;

FIG. 4 is a schematic view of an exemplary embodiment of a panel layer for use in constructing a football;

DETAILED DESCRIPTION

The various embodiments described herein relate to an inflatable game ball, particularly, but not necessarily, an inflatable game ball in the shape of a spheroid and/or a prolate spheroid. In an exemplary embodiment, a prolate spheroidal inflatable game ball may be pointed at the ends, for example as is typically used in American football. While the pointedness of an inflatable game ball typically used to play American football, including footballs approved for use in the NFL, NCAA, high school or other leagues, causes it to differ from a true geometric prolate spheroid, such footballs are generally considered to be prolate spheroidal balls, and are encompassed by that term as used herein.

In other embodiments, prolate spheroidal inflatable game balls may be configured with shapes that correspond to balls used with other sports, including, but not limited to rugby, Australian rules football, and other sports using a ball having an oblong or elliptical spheroidal shape.

Figure 1:
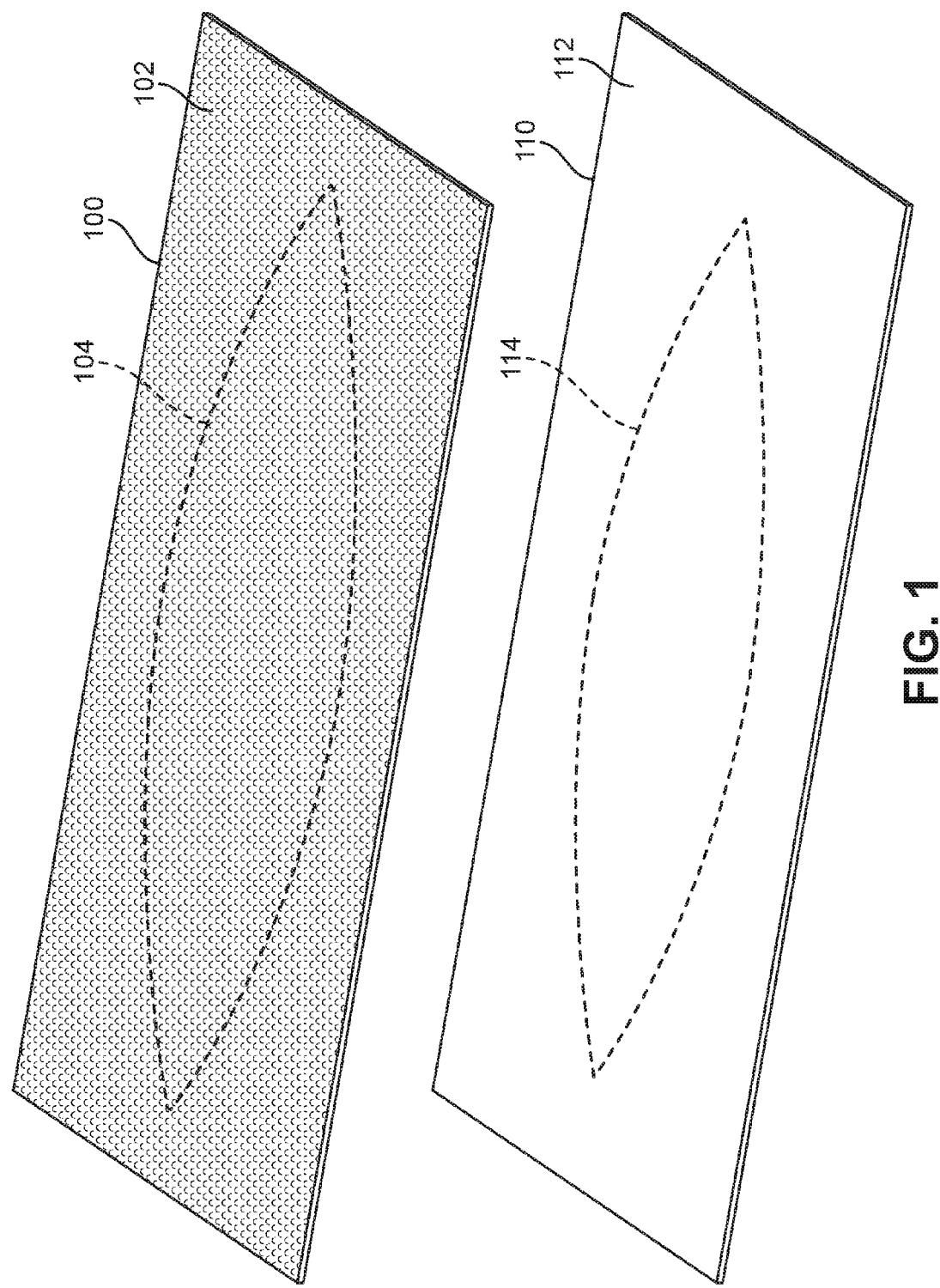
FIG. 1 is a schematic view of an exemplary embodiment of a process of constructing an inflatable game ball in the form of a football.

FIGS. 1-15 illustrate an exemplary embodiment of a process of constructing an inflatable game ball and an inflatable game ball in the form of a football made using the exemplary process. FIG. 1 illustrates an exemplary embodiment of materials for constructing a football. While the exemplary process described herein is used for constructing a football, similar principles may be applied to the construction of other inflatable game balls, including footballs, soccer balls, basketballs, volleyballs, and other game balls having a cover and inflatable bladder.

In some embodiments, a cover for a football may be made of multiple individual panel segments. In one embodiment, a cover for a football may be made of four individual panel segments. In other embodiments, however, a larger or smaller number of panel segments may be used to form the cover. A cover may be made of a variety of materials, including, but not limited to natural leather or hide, synthetic leather, woven and non-woven fabrics, rubber, plastics, or any other materials known in the art. In some cases, different materials may be used for different portion of a cover.

In an exemplary embodiment, an outer layer for a cover of a football may be made of an outer layer material 100. In this embodiment, outer layer material 100 is a natural leather or hide material having a textured surface 102. In other embodiments, outer layer material 100 may include synthetic leather or other suitable materials for a cover, described above. In one embodiment, a first pattern 104 that corresponds to a desired shape and size of the panels forming the outer layer of the cover of the football may be provided on outer layer material 100.

In some embodiments, a cover of a football may further include an inner layer or a backing layer that is associated with the outer layer of the cover. In an exemplary embodiment, an inner layer for a cover may be made of an inner layer material 110. In this embodiment, inner layer material 110 is a woven or non-woven textile material, such as cotton, nylon or polyester, having a top surface 112. In other embodiments, inner layer material 110 may include canvas or other fabrics, rubber, or other suitable materials for a cover, described above. In one embodiment, a second pattern 114 that corresponds to a desired shape and size of the panels forming the inner layer or backing layer of the cover of the football may be provided on inner layer material 110.

In an exemplary embodiment, first pattern 104 associated with an outer panel layer may be larger than second pattern 114 associated with an inner panel layer. As will be described in more detail below, a method of football constructing using panel layers having different sizes can assist with providing footballs having more consistent dimensions when fully inflated.

Figure 2:
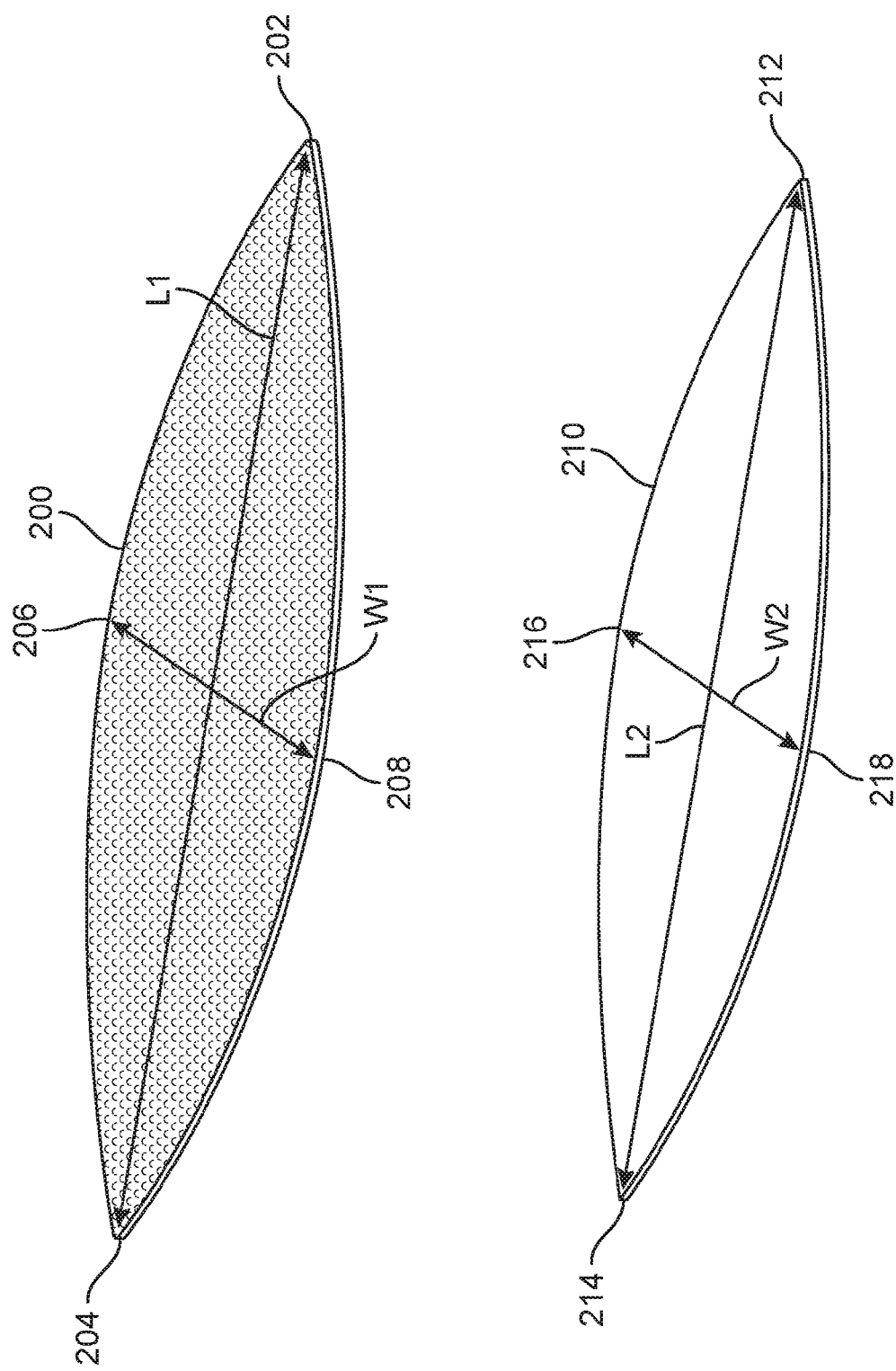
FIG. 2 is a schematic view of an exemplary embodiment of a process of constructing a football using panel layers having different sizes.

Referring now to FIG. 2, an exemplary embodiment of a process for forming a panel segment of a cover of a football is illustrated. In some embodiments, a first outer panel portion 200 may be an outer panel layer that is removed from outer layer material 100 along first pattern 104. In one embodiment, first outer panel portion 200 may be associated with a pointed elliptical shape having a first length L1 in a longitudinal direction between a first end 202 and a second end 204 along a major axis and a first width W1 in a lateral direction between a first side 206 and a second side 208 along a minor axis. In some embodiments, a first inner panel portion 210 may be an inner panel layer that is similarly removed from inner layer material 110 along second pattern 114. In one embodiment, first inner panel portion 210 may be associated with a pointed elliptical shape having a second length L2 in a longitudinal direction between a first end 212 and a second end 214 along a major axis and a second width W2 in a lateral direction between a first side 216 and a second side 218 along a minor axis.

In various embodiments, first outer panel portion 200 and/or first inner panel portion 210 may be removed from outer layer material 100 and/or inner layer material 110 using any known method of removing material along a pattern, for example, by cutting or stamping.

In an exemplary embodiment, first length L1 associated with first outer panel portion 200 may be larger than second length L2 associated with first inner panel portion 210. In some cases, first length L1 may be approximately 2 mm to 8 mm larger than second length L2. In one embodiment, first length L1 may be approximately 4 mm larger than second length L2. In other cases, first length L1 may be less than 2 mm larger than second length L2 or may be more than 8 mm larger than second length L2. In a similar manner, first width W1 associated with first outer panel portion 200 may be larger than second width W2 associated with first inner panel portion 210. In some cases, first width W1 may be approximately 2 mm to 8 mm larger than second width W2. In one embodiment, first width W1 may be approximately 4 mm larger than second width W2. In other cases, first width W1 may be less than 2 mm larger than second width W2 or may be more than 8 mm larger than second width W2. In different embodiments, the difference in lengths and/or widths between the panels may vary from 0 mm to 12 mm.

In some embodiments, the difference between the sizes of the respective panel layers may be substantially uniform around the perimeter of the panel such that the difference between the lengths of the panels is substantially similar to the difference between the widths of the panels. In an exemplary embodiment, the difference between first length L1 and second length L2 may be substantially similar to the difference between first width W1 and second width W2. Referring now to FIG. 3A, a top plan view of first outer panel portion 200 and first inner panel portion 210 having different sizes is illustrated. As shown in this embodiment, the difference in sizes between first outer panel portion 200 and first inner panel portion 210 is substantially uniform around the entire perimeter of the panels. In this embodiment, a first distance D1 separates the peripheral edges of first outer panel portion 200 and first inner panel portion 210 at both first side 206 of first outer panel portion 200 and first side 216 of first inner panel portion 210 and at first end 202 of first outer panel portion 200 and first end 212 of first inner panel portion 210. Additionally, in this embodiment, first distance D1 separates the peripheral edges of other portions of first outer panel portion 200 and first inner panel portion 210 between first side 206, 216 and first end 202, 212, as well as other portions around the perimeter of the two panel portions.

In some embodiments, first distance D1 may be substantially equal to approximately half the difference between first length L1 and second length L2 and/or first width W1 and second width W2. Accordingly, in some cases, first distance D1 may be approximately from 1 mm to 4 mm. In one embodiment, first distance D1 may be approximately 2 mm. In other cases, first distance D1 may be less than 1 mm or may be more than 4 mm.

Figure 3B:
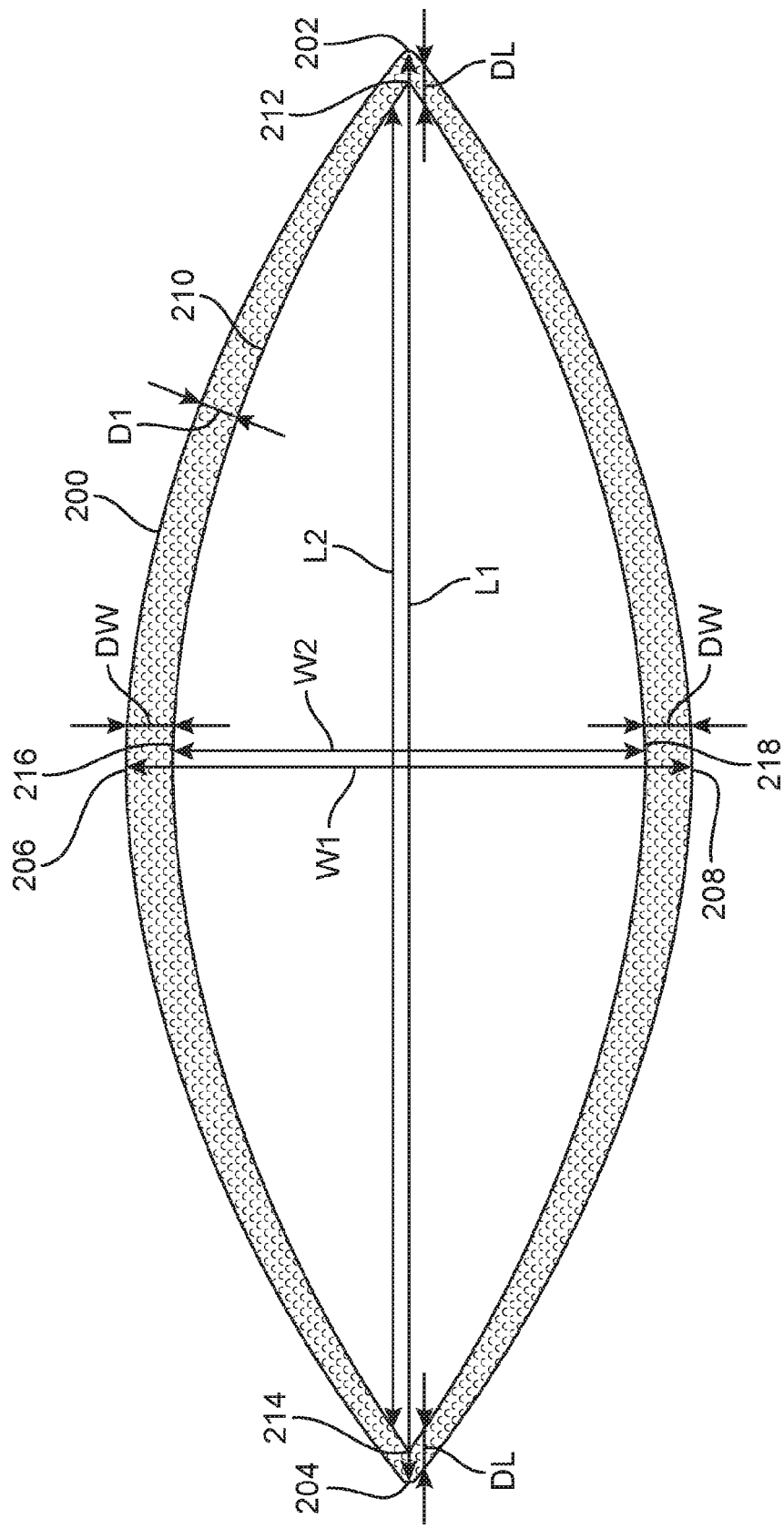
FIG. 3B is a top plan view of exemplary embodiments of panel layers having different sizes for use in constructing a football.

In some embodiments, the difference between the sizes of the respective panel layers may vary at different portions around the perimeter of the panels such that the difference between the lengths of the panels is different than the difference between the widths of the panels. In an exemplary embodiment, the difference between first length L1 and second length L2 may be different than the difference between first width W1 and second width W2. Referring now to FIG. 3B, a top plan view of first outer panel portion 200 and first inner panel portion 210 having different sizes is illustrated. As shown in this embodiment, the difference in sizes between first outer panel portion 200 and first inner panel portion 210 varies at different portions around the perimeter of the panels. In this embodiment, a difference in width distance DW separates the peripheral edges of first outer panel portion 200 and first inner panel portion 210 at both first side 206 of first outer panel portion 200 and first side 216 of first inner panel portion 210. In contrast, a difference in length distance DL separates the peripheral edges of first outer panel portion 200 and first inner panel portion 210 at first end 202 of first outer panel portion 200 and first end 212 of first inner panel portion 210.

In some embodiments, difference in width distance DW may be different than difference in length distance DL. In an exemplary embodiment, difference in width distance DW may be larger than difference in length distance DL. In one embodiment, first outer panel portion 200 may be approximately 2 mm larger in length than first inner panel portion 210, corresponding to difference in length distance DL of approximately 1 mm at each of first end 202, 212 and second end 204, 214 and first outer panel portion 200 may be approximately 4.5 mm larger in width than first inner panel portion 210, corresponding to a difference in width distance DW of approximately 2.25 mm at each of first side 206, 216 and second side 208, 218. With this arrangement, the proportion of difference in length distance DL to difference in width distance DW may provide sufficient stretch along each of the longitudinal and lateral directions of the cover of the football when in the fully inflated condition such that variations in dimensions of the football are minimized or reduced.

In some cases, difference in width distance DW may be approximately from 2 mm to 2.5 mm and difference in length distance DL may be approximately from 0.75 mm to 1.5 mm. In other cases, difference in width distance DW may be less than 2 mm or may be more than 2.5 mm and difference in length distance DL may be less than 0.75 mm or may be more than 1.5 mm. Additionally, in this embodiment, portions of the peripheral edges of first outer panel portion 200 and first inner panel portion 210 between first side 206, 216 and first end 202, 212, may vary in a substantially continuous manner from difference in width distance DW at first side 206, 216 and different than difference in length distance DL at first end 202, 212. The remaining portions of the peripheral edges disposed around the perimeter of first outer panel portion 200 and first inner panel portion 210 may vary in a substantially similar manner.

Accordingly, by varying the difference in sizes along different directions of the panel layers, the amount of stretch along each direction of the constructed football may be limited or restricted by different amounts. With this arrangement, a panel segment may have a larger difference between the respective widths of the panel layers than the difference between the respective lengths of the panel layers to account for a larger amount of stretch that occurs along the width of the panels in the lateral direction than the amount of stretch that occurs along the length of the panels in the longitudinal direction when an inflatable bladder is in a fully inflated condition.

FIGS. 4 through 7 illustrate an exemplary embodiment of a process of assembling a single panel segment for use in constructing a football. It should be understood that the process may be repeated to produce additional panel segments that will be combined to form the cover of the football, as will be described below. Referring now to FIG. 4, in some embodiments, first inner panel portion 210 may be joined with first outer panel portion 200. In one embodiment, first inner panel portion 210 may have a band of adhesive 300 disposed along a peripheral edge 302 of first inner panel portion 210. Adhesive 300 may be a glue, double-sided tape, or other bonding agent. In an exemplary embodiment, adhesive 300 may extend substantially around the entire perimeter of first inner panel portion 210 along peripheral edge 302. In this embodiment, adhesive 300 may be applied from peripheral edge 302 to an inner periphery 304 located approximately a second distance D2 from peripheral edge 302. In one embodiment, second distance D2 may be approximately 2 mm to 5 mm. In other embodiments, second distance D2 may be larger or smaller.

Adhesive 300 may be any type of adhesive or bonding agent that is configured to hold or otherwise associate first inner panel portion 210 and first outer panel portion 200 together. In some cases, adhesive 300 may be sufficiently strong so as to temporary associate together and to hold the respective panel portions in place so that the panel portions may be joined using a permanent attachment mechanism, for example, stitching or bonding. In other cases, first inner panel portion 210 may be joined to first outer panel portion 200 using other known attachment mechanisms, including, but not limited to bonding, welding, stitching or other temporary or permanent attachment mechanisms.

Figure 5:
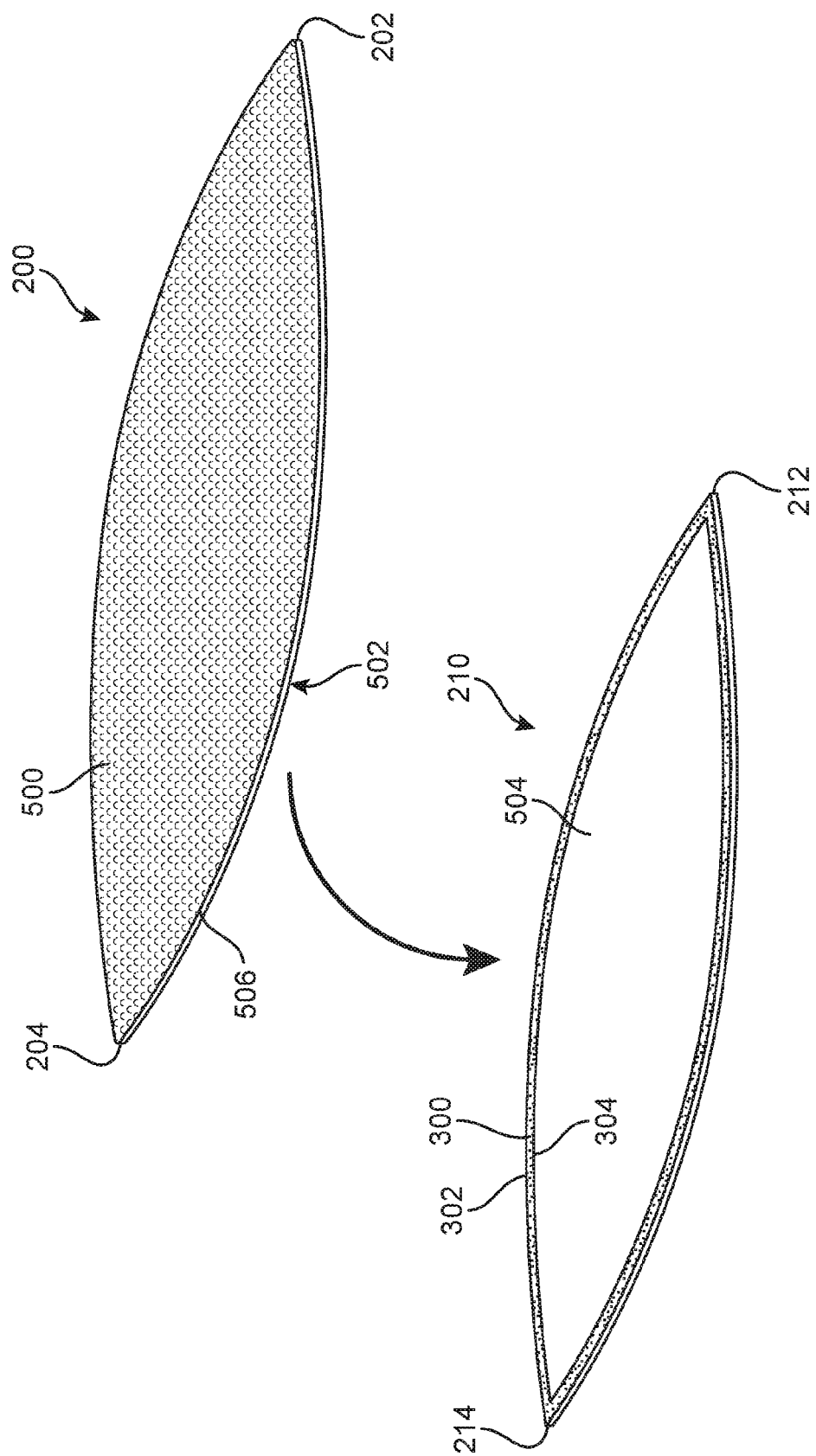
FIG. 5 is a schematic view of an exemplary embodiment of a process of joining panel layers for use in constructing a football.

FIG. 5 illustrates first outer panel portion 200 aligned over first inner panel portion 210. First outer panel portion includes an exterior surface 500 and an interior surface 502. In this embodiment, exterior surface 500 includes a textured surface to assist with grippability of the cover of the constructed football. First inner panel portion 210 includes a top surface 504 and a bottom surface (not visible). In this embodiment, adhesive 300 is disposed on top surface 504 extending around peripheral edge 302. However, in some embodiments, first outer panel portion 200 may also have a substantially similar adhesive applied onto interior surface 502 to assist with adhesion between first inner panel portion 210 and first outer panel portion 200.

In an exemplary embodiment, the separate panel portions may be arranged such that interior surface 502 of first outer panel portion 200 is oriented towards top surface 504 of first inner panel portion 210. In an exemplary embodiment, a peripheral edge 506 of first outer panel portion 200 may be brought together with peripheral edge 302 of first inner panel portion 200.

Figure 6:
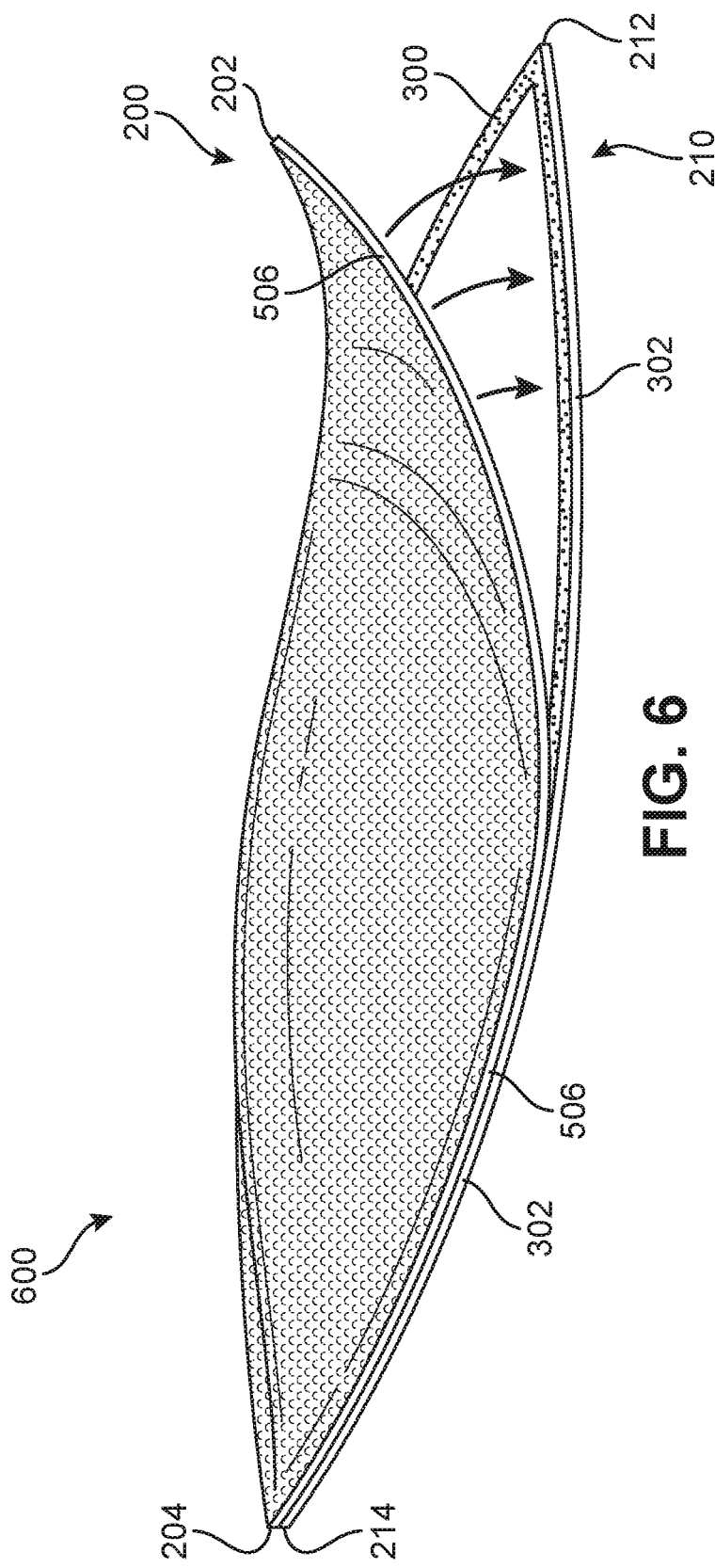
FIG. 6 is a schematic view of an exemplary embodiments of a process of joining panel layers along corresponding peripheral edges.
Figure 7:
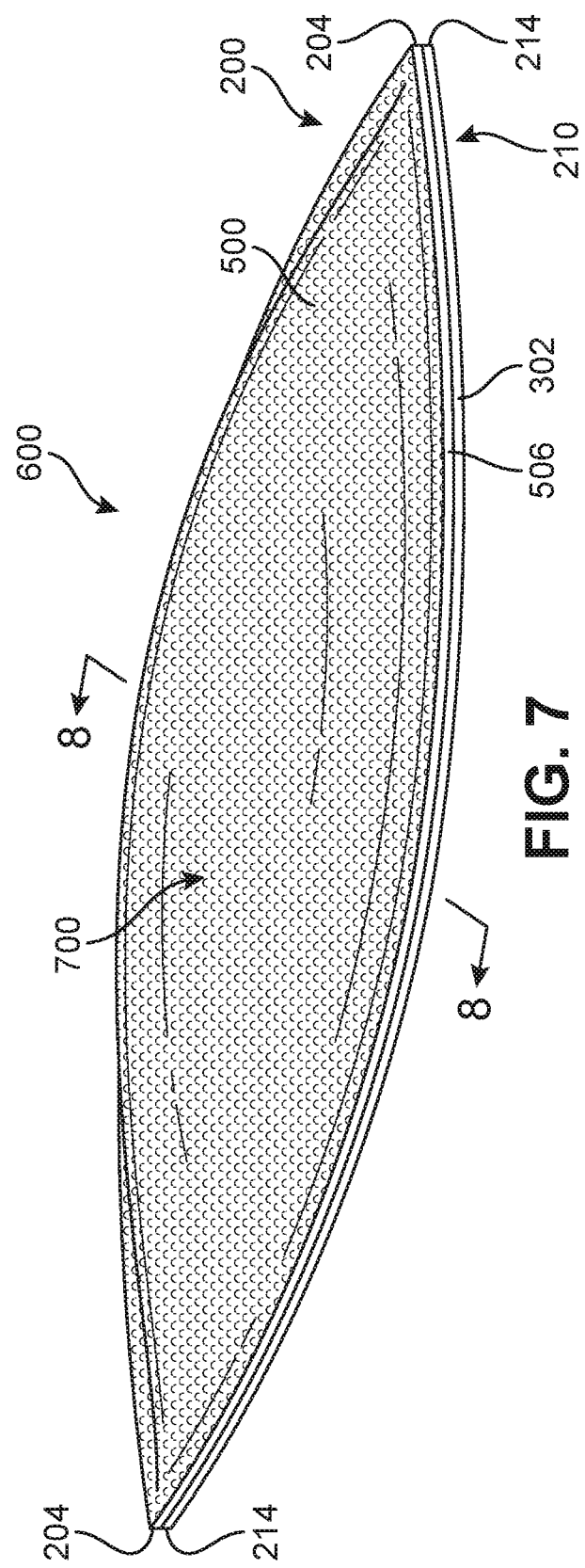
FIG. 7 is a schematic view of an exemplary embodiment of a panel segment for a football.

FIGS. 6 and 7 illustrate an exemplary embodiment of forming a first panel segment 600 by joining first outer panel portion 200 and first inner panel portion 210. As shown in FIG. 6, second end 204 of first outer panel portion 200 is joined at second end 214 of first inner panel portion 210 and peripheral edge 506 is joined with peripheral edge 302 extending along the perimeter of first inner panel portion 210 towards first end 212. Referring now to FIG. 7, in an exemplary embodiment, peripheral edge 506 of first outer panel portion 200 and peripheral edge 302 of first inner panel portion 210 are joined by adhesive 300 along entire perimeter of first inner panel portion 210. Together, first outer panel portion 200 and first inner panel portion 210 form first panel segment 600. Adhesive 300 holds peripheral edge 506 in alignment with peripheral edge 302. With this configuration, the smaller size of first inner panel portion 210 causes first outer panel portion 200 to bulge outward causing exterior surface 500 to have a substantially convex surface 700. In other embodiments, other attachment mechanisms may be similarly used to join peripheral edge 506 of first outer panel portion 200 and peripheral edge 302 of first inner panel portion 210 along the respective perimeters.

Figure 8:
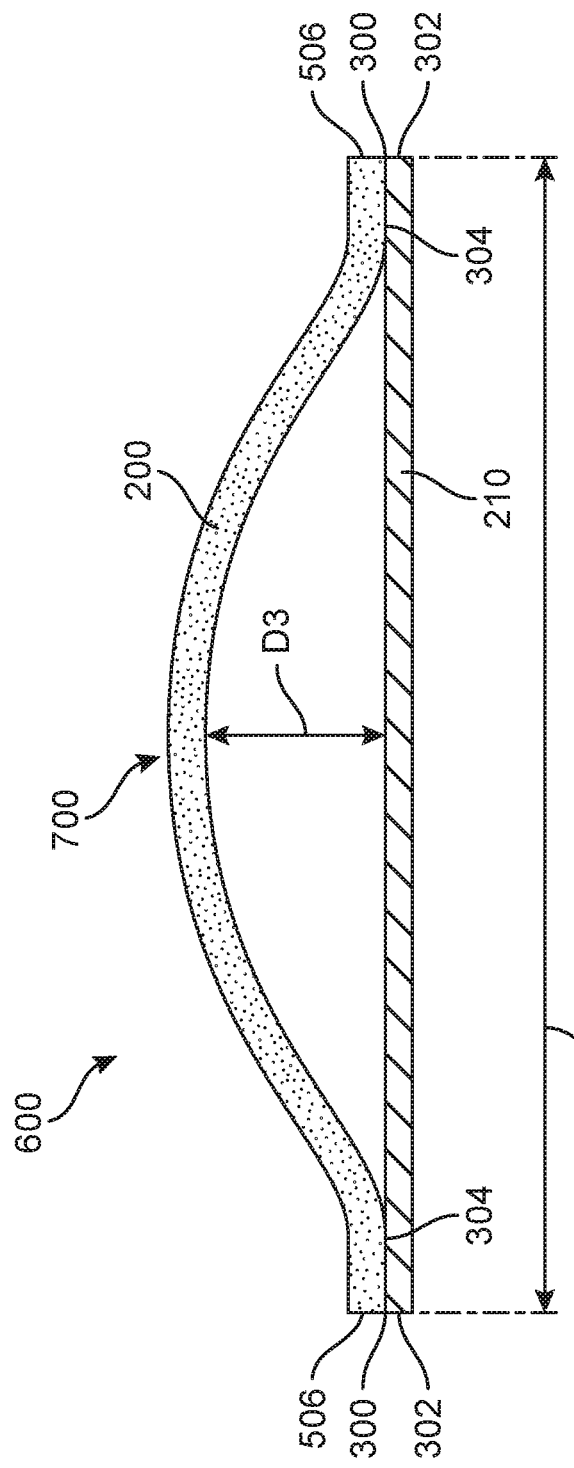
FIG. 8 is a cross-section view of an exemplary embodiment of a panel segment for a football.

FIG. 8 shows a cross-section view of first panel segment 600. In this embodiment, peripheral edge 506 and peripheral edge 302 are substantially aligned so that both first outer panel portion 200 and first inner panel portion 210 have second width W2. However, because first width W1 of first outer panel portion 200 is larger than second width W2, first outer panel portion 200 bulges outward causing exterior surface 500 to have convex surface 700. In this embodiment, convex surface 700 of first outer panel portion 200 bulges outward by a third distance D3 from first inner panel portion 210. In some embodiments, third distance D3 is approximately equal to the difference between first width W1 and second width W2. In some cases, third distance D3 may be from 2 mm to 8 mm. In one embodiment, third distance D3 may be approximately 4 mm. In other cases, third distance D3 may be less than 2 mm or may be more than 8 mm.

Figure 9:
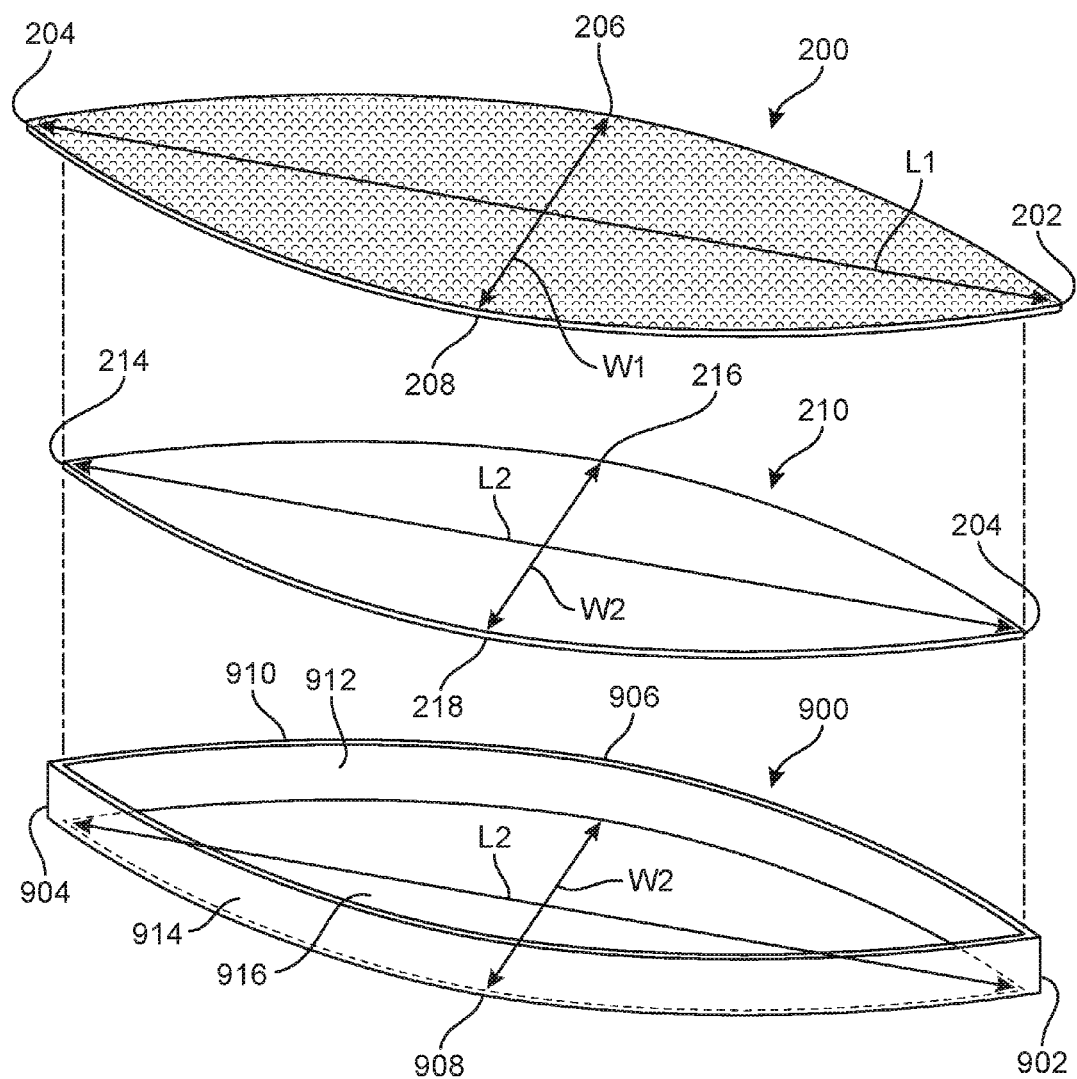
FIG. 9 is an exploded view of an exemplary embodiment of an alignment guide for use in constructing a football.
Figure 10:
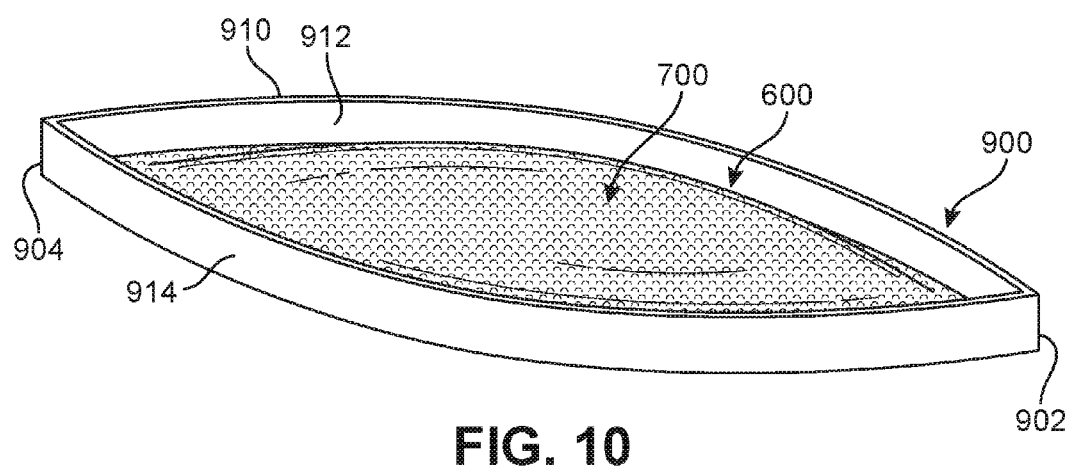
FIG. 10 is a schematic view of an exemplary embodiment of an alignment guide and panel segment.

In some embodiments, the process described above for aligning peripheral edge 506 of first outer panel portion 200 and peripheral edge 302 of first inner panel portion 210 may be assisted by using an alignment guide. FIGS. 9 and 10 illustrate an exemplary embodiment of an alignment guide 900 that may be provided to assist with the process of aligning the peripheral edges of first outer panel portion 200 and first inner panel portion 210. In some embodiments, alignment guide 900 may be a jig or mold that has interior dimensions that correspond to the dimensions associated with first inner panel portion 210.

In this embodiment, the interior dimensions of alignment guide 900 correspond to second length L2 in a longitudinal direction between a first end 902 and a second end 904 along a major axis and second width W2 in a lateral direction between a first side 906 and a second side 908 along a minor axis. In an exemplary embodiment, the interior dimensions of alignment guide 900 correspond to second length L2 and second width W2 associated with first inner panel portion 210, described above.

In some embodiments, alignment guide 900 may be made of a rigid or semi-rigid material that is configured to hold a shape of the panel portions disposed with an interior 916 of alignment guide 900. In an exemplary embodiment, alignment guide 900 may include a wall 910 that extends around the perimeter of alignment guide 900. Wall 910 may include an outer surface 914 and an inner surface 912. In some cases, alignment guide 900 may include a releasable attachment mechanism, for example, a band or clamp, so that wall 910 may be opened or closed to release the completed panel segment from within interior 916 of alignment guide.

In some embodiments, the process of FIGS. 4 through 7 may be performed using alignment guide 900. In an exemplary embodiment, first inner panel portion 210 may be placed into interior 916 of alignment guide 900 such that peripheral edge 302 is substantially surrounded by inner surface 912 of wall 910. Next, adhesive 300 may be applied to one or more of top surface 504 of first inner panel portion 210 and/or interior surface 502 of first outer panel portion 200. As shown in FIG. 9, first outer panel portion 200 has dimensions of first length L1 and first width W1 that are larger than the interior dimensions of alignment guide 900. Accordingly, when first outer panel portion 200 is placed into interior 916 of alignment guide 900 to join with first inner panel portion 210, inner surface 912 of wall 910 may serve as a guide to constrain movement of first outer panel portion 200, thereby keeping peripheral edge 302 and peripheral edge 506 aligned so that adhesive 300 may set. In other embodiments, inner surface 912 of wall 910 may similarly serve as a guide to constrain movement peripheral edge 506 of first outer panel portion 200 and peripheral edge 302 of first inner panel portion 210 while other attachment mechanisms are used to join the panel portions along their respective perimeters. For example, in embodiments where welding is used, wall 910 may hold the respective edges in alignment while an ultrasonic welder or other welding apparatus is used to join peripheral edge 506 of first outer panel portion 200 and peripheral edge 302 of first inner panel portion 210.

As shown in FIG. 10, in this embodiment, first inner panel portion 210 and first outer panel portion 200 may be placed within interior 916 of alignment guide 900 such that peripheral edge 302 and peripheral edge 506 are bounded by inner surface 912 of wall 910. First panel segment 600 may then be removed from alignment guide 900. In some embodiments, multiple panel segments substantially similar to first panel segment 600 may be formed using a similar process, including with or without alignment guide 900.

Figure 11:
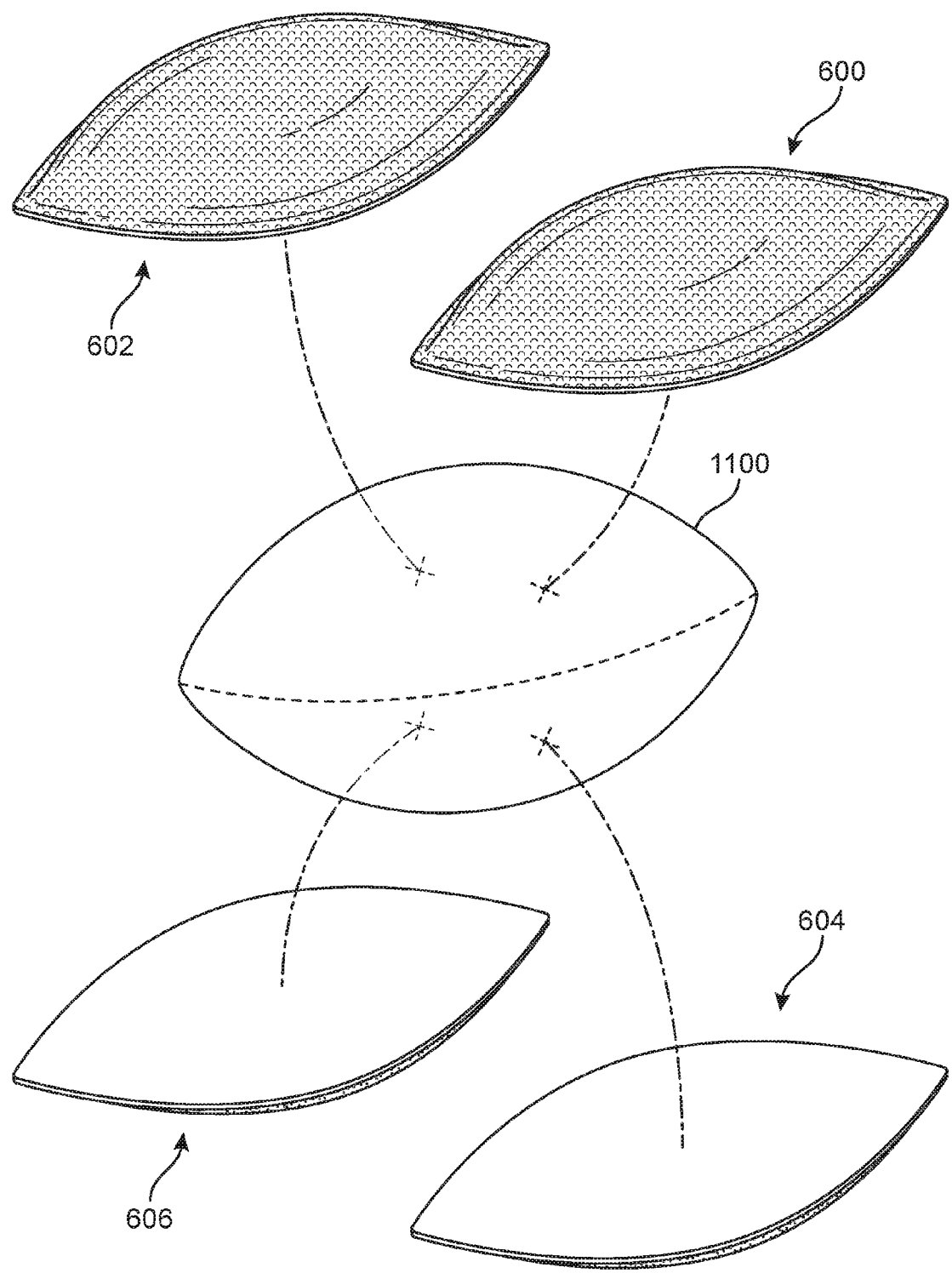
FIG. 11 is an exploded view of an exemplary embodiment of a football.

Referring now to FIG. 11, an exploded view of a football constructed with multiple panel segments around an inflatable bladder 1100 is shown. In some embodiments, multiple panel segments substantially similar to first panel segment 600 may be formed using the process described above. In an exemplary embodiment, the multiple panel segments may be joined together to form a cover and be associated with inflatable bladder 1100 to construct a football. In this embodiment, four panel segments are provided to form the cover, including first panel segment 600, a second panel segment 602, a third panel segment 604, and a fourth panel segment 606. Each of second panel segment 602, third panel segment 604, and fourth panel segment 606 may have a substantially similar construction as first panel segment 600, including an outer panel portion and an inner panel portion having different sizes that are joined along corresponding peripheral edges.

In some embodiments, a cover for a football may include multiple panel segments that are stitched, sewed or otherwise joined together along respective edges using adhesive, ultrasonic welding, bonding, or other attachment mechanisms known in the art to form the cover. In some configurations, a cover is formed inside-out, with the interior surface facing outwards and the exterior surface facing inwards. A portion of the respective edges between a pair of adjacent panel segments is left unattached so that an opening is provided to the interior of the inside-out cover. The cover is then turned right-side out by pushing the cover through the opening so that the exterior surface is facing outwards and the interior surface is facing inwards. An inflatable bladder may then be inserted through the opening and inflated.

Figure 12:
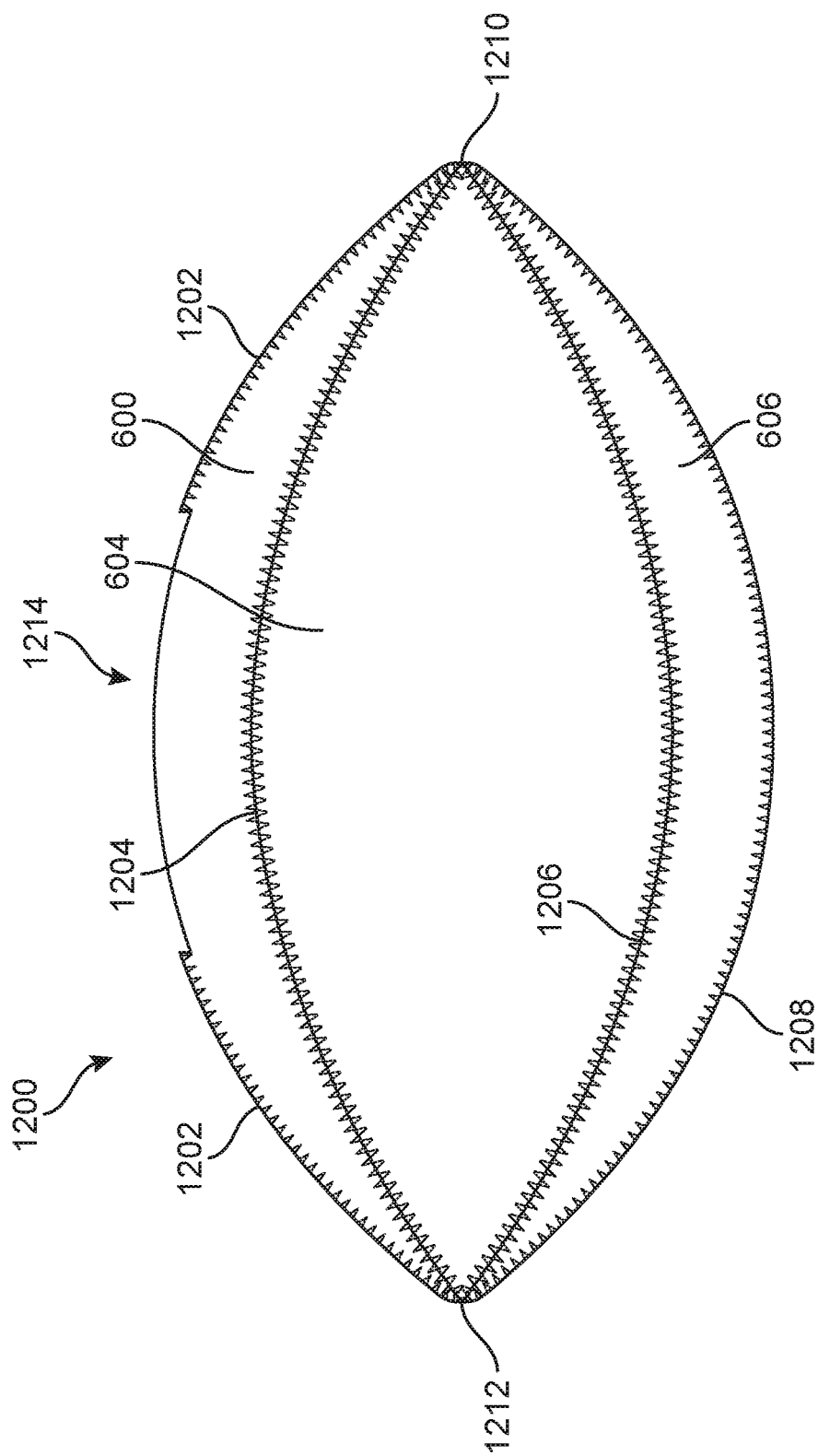
FIG. 12 is a schematic view of an exemplary embodiment of a process of joining multiple panel segments to form a cover for a football.

Referring now to FIG. 12, an exemplary embodiment of a cover 1200 of a football is illustrated. In an exemplary embodiment, four panel segments, including first panel segment 600, second panel segment 602, third panel segment 604, and fourth panel segment 606 may be joined together to form cover 1200. In one embodiment, the panels are joined by stitching along the respective adjacent edges of each panel segment. In an exemplary embodiment, the stitching joining the adjacent panel segments is configured to pass through both the outer panel portion and the inner panel portion of each panel segment at or near the adhesively attached peripheral edges.

In this embodiment, first panel segment 600 is stitched to third panel segment 604 along a seam 1204. With this arrangement, the stitching of seam 1204 is configured to pass through first outer panel portion 200, first inner panel portion 210, as well as a similar outer panel portion and inner panel portion associated with third panel segment 604. Each of the remaining panel segments may be similarly joined, such that third panel segment 604 is stitched to fourth panel segment 606 along a seam 1206 and fourth panel segment 606 is stitched to second panel segment 602 (not shown in FIG. 12) along a seam 1208. Additionally, first panel segment 600 may be stitched to portions of second panel segment 602 along a seam 1202 that extends from each of a first end 1210 and a second end 1212 of cover 1200. A portion of first panel segment 600 and second panel segment 602 may remain unattached to form an opening 1214.

In some embodiments, opening 1214 may be provided so that cover 1200 may be turned right-side out through opening 1214. Additionally, opening 1214 may further permit inflatable bladder 1100 to be inserted within cover 1200. In an exemplary embodiment, inflatable bladder 1100 may be inserted within cover 1200 in a deflated condition. Inflatable bladder 1100 may be filled with air to a particular pressure level to a fully inflated condition. A variety of pressure levels may be appropriate for a ball for any particular game. In some cases, a conventional inflation valve (not shown) that permits the insertion of a typical needle (not shown) that may be connected to a bicycle pump or other suitable air pump (not shown) may be included to allow air to be introduced into inflatable bladder 1100. This type of inflation valve may be positioned anywhere desirable or convenient on cover 1200 as a designer might select.

Figure 13:
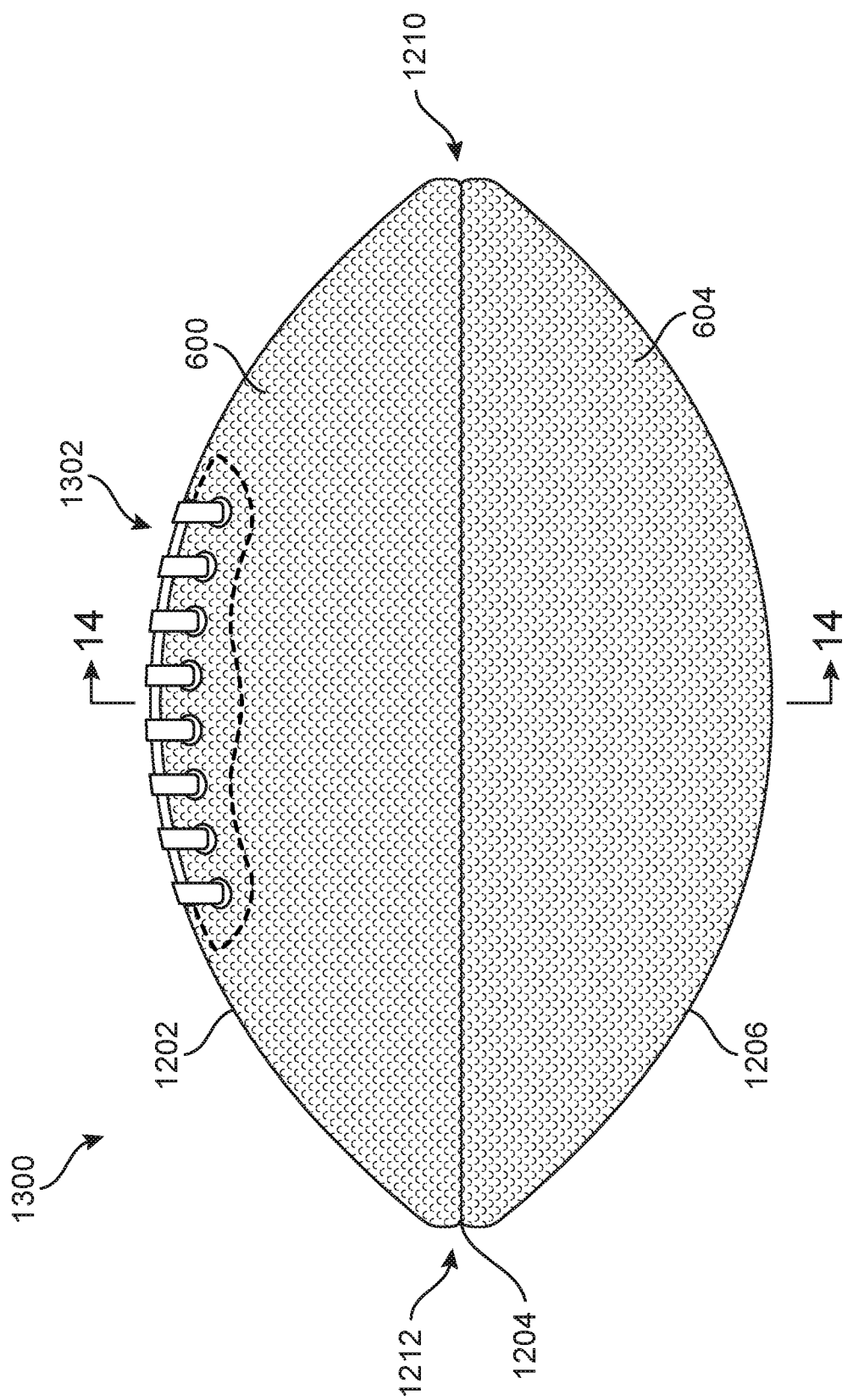
FIG. 13 is a schematic view of an exemplary embodiment of a football formed of multiple panel segments.

FIG. 13 illustrates an exemplary embodiment of a finished football 1300. The dimensions of football 1300 may be configured in accordance with the rules and requirements of different agencies, including, but not limited to the NFL, NCAA, high school or other leagues and/or agencies, which rules and requirements may be changed from time to time. For example, the NFL currently requires that a regulation football have a long axis that measures 11 to 11¼ inches, a long circumference that measures 28 to 28½ inches, and a short circumference that measures 21 to 21¼ inches. The NCAA currently requires that a regulation football have a long axis that measures 10⅞ inches to 11⁷⁄₁₆ inches, a long circumference that measures 27¾ inches to 28½ inches, and a short circumference that measures 20¾ inches to 21¼ inches. Other agencies can have different requirements for the dimensions of a regulation football. Each of the various rules and regulations recognize variations in the dimensions of the football that are permitted between individual footballs that are still considered to be regulation footballs within the rules or regulations. By constructing a football using the process described herein, the amount of variation between individual footballs produced with the required dimensions may be limited or minimized.

Referring again to FIG. 13, football 1300 includes four panel segments, including first panel segment 600, second panel segment 602, third panel segment 604, and fourth panel segment 606, described above. Together, the outer panel portions of the respective panel segments of cover 1200 form the exterior surface of football 1300. Additionally, a lace element 1302 may be included as a functional component of football 1300, for example to secure parts of adjacent panel segments of cover 1200 to one another. Lace element 1302 may also assist a user in correctly positioning his or her hand to pass or grip football 1300. In addition, in some cases, lace element 1302 may be included to perform a decorative function for football 1300.

In various embodiments, lace element 1302 may be attached to cover 1200 in any suitable conventional manner, depending on the materials selected for cover 1200 and lace element 1302. For example, cover 1200 and lace element 1302 may both be made from leather and/or synthetic leather and lace element 1302 may be inserted into perforations in cover 1200. In some embodiments, reinforcements may be included on the perforations in cover 1200 to prevent lace element 1302 from tearing through cover 1200. In another example, cover 1200 may be rubber and lace element 1302 may be polyvinyl chloride, rubber, silicone, or other thermoplastic elastomers. In some embodiments, an adhesive might be used to adhere lace element 1302 to the outside of cover 1200.

Figure 14:
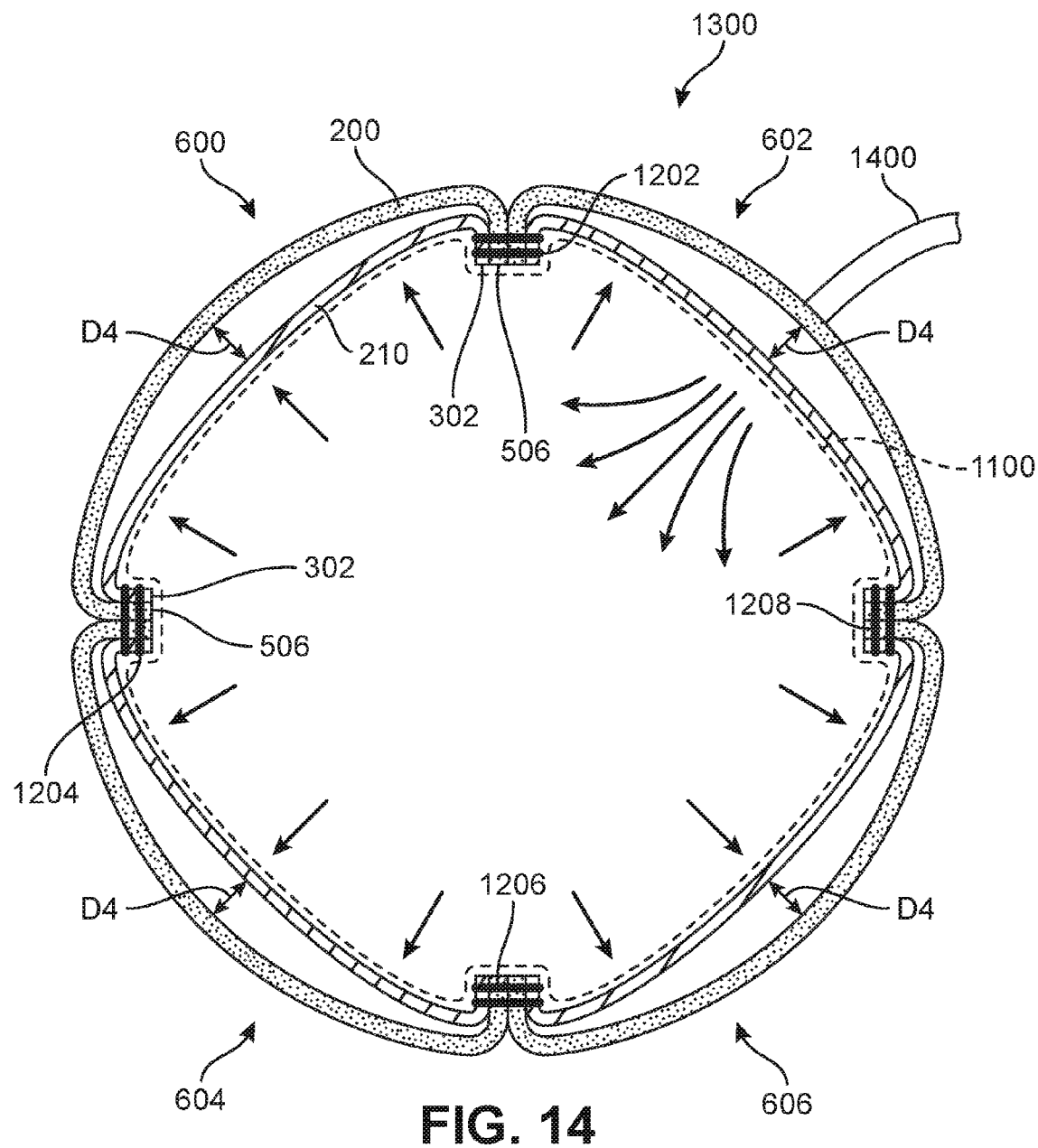
FIG. 14 is a cross-section view of an exemplary embodiment of a football illustrating panel layers and an inflatable bladder in the process of being inflated.
Figure 15:
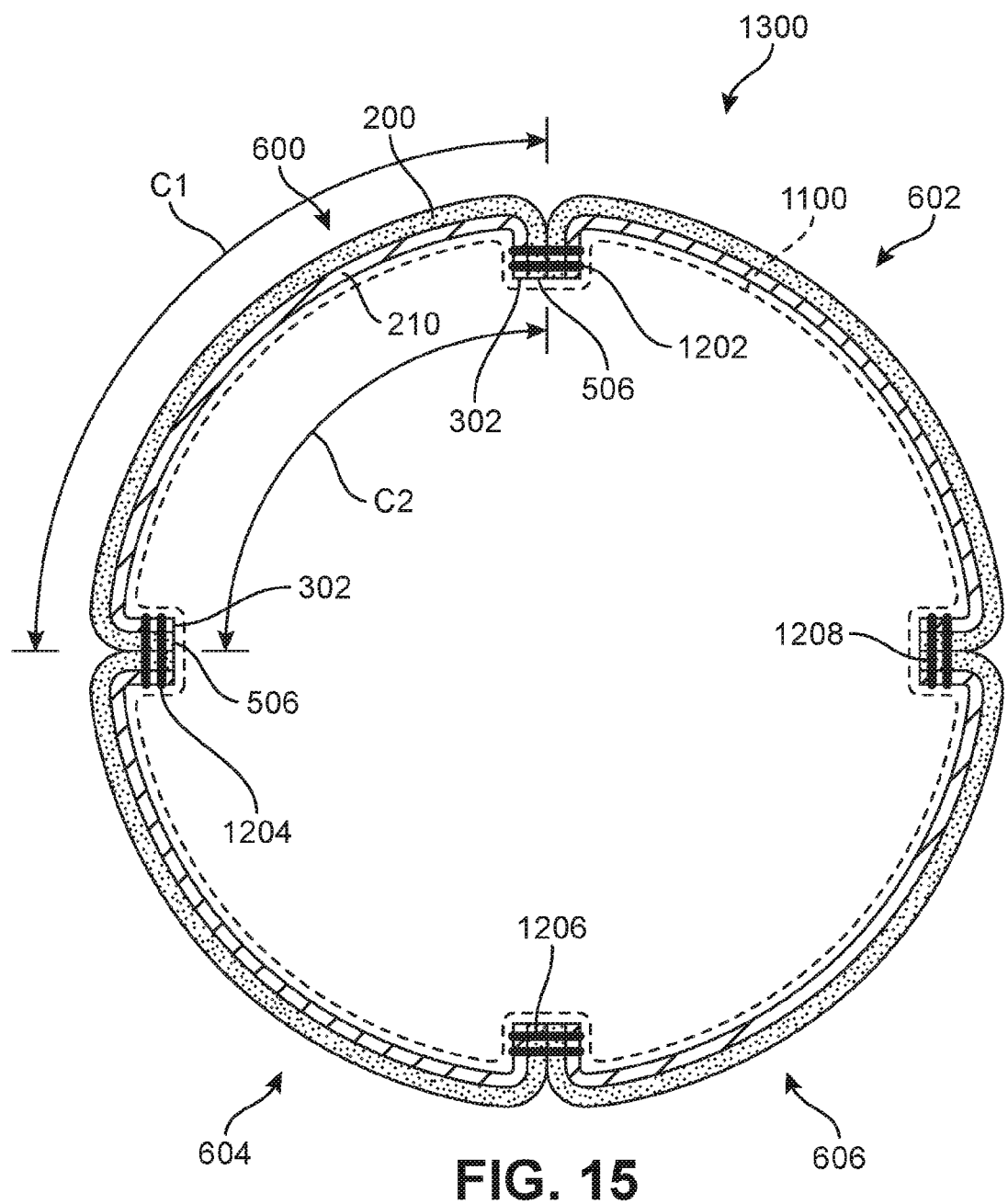
FIG. 15 is a cross-section view of an exemplary embodiment of a football illustrating panel layers and an inflatable bladder in a fully inflated condition.

FIGS. 14 and 15 illustrate cross-section views of football 1300 with inflatable bladder 1100 in a deflated or partially inflated condition (FIG. 14) and a fully inflated condition (FIG. 15). Referring now to FIG. 14, inflatable bladder 1100 is shown disposed within the interior of football 1300 surrounded by cover 1200. In this embodiment, inflatable bladder 1100 is in a deflated or partially inflated condition and is being filled with air from an air pump 1400 via an air valve (not shown) disposed on cover 1200 that is in communication with inflatable bladder 1100.

In some embodiments, when inflatable bladder 1100 is in a deflated or partially inflated condition, the outer panel portion and the inner panel portion of each panel segment may be disposed apart from each other. In an exemplary embodiment, the peripheral edges of the larger outer panel portion are joined along the peripheral edges of the smaller inner panel portion, causing the exterior surface of the outer panel portion to bulge outwards, as described above in reference to first panel segment 600. In this embodiment, first outer panel portion 200 is disposed a fourth distance D4 from first inner panel portion 210. In some embodiments, fourth distance D4 may be equal to or slightly smaller than the difference between first width W1 and second width W2. In some cases, fourth distance D4 may be from 2 mm to 8 mm. In one embodiment, fourth distance D4 may be approximately 4 mm. In other cases, fourth distance D4 may be less than 2 mm or may be more than 8 mm.

In an exemplary embodiment, each of the peripheral edges of first outer panel portion 200 and first inner panel portion 210 forming first panel segment 600 are joined with stitching to each other, as well as the respective peripheral edges of the adjacent panel segment, along seams. In this embodiment, peripheral edge 506 of first outer panel portion 200 is joined with stitching to peripheral edge 302 of first outer panel portion 210 to the respective peripheral edges of the panel portions of second panel segment 602 along seam 1202 and to the respective peripheral edges of the panel portions of third panel segment 604 along seam 1204. Each of the panel segments, including second panel segment 602, third panel segment 604, and fourth panel segment 606 may have a correspondingly similar structure and be joined with stitching in a similar manner as first panel segment 600.

As shown in FIG. 14, when air from air pump 1400 begins to inflate inflatable bladder 1100, the air pushes the inner panel portions, including first inner panel portion 210, towards the opposite outer panel portion, including first outer panel portion 200. As inflatable bladder 1100 approaches the fully inflated condition, the inner panel portions will become pushed closer to and/or contact with, the outer panel portions. For example, first inner panel portion 210 may be pushed towards first inner panel portion 200, thereby reducing fourth distance D4 separating the panel portions to substantially zero when inflatable bladder 1100 reaches a fully inflated condition.

FIG. 15 illustrates inflatable bladder 1100 in a fully inflated condition and in contact with cover 1200 disposed within the interior of football 1300. In an exemplary embodiment, when inflatable bladder 1100 is in the fully inflated condition, inflatable bladder 1100 will press against each of the inner panel portions of the panel segments disposed about the inside of cover 1200, including first panel segment 600, second panel segment 602, third panel segment 604, and fourth panel segment 606. The pressure from inflatable bladder 1100 against the inner panel portions causes the top surface of each inner panel portion to be pushed up against the interior surface of the corresponding outer panel portion. For example, with regard to first panel segment 600, the top surface of first inner panel portion 210 is pressed up against and abutting the interior surface of first outer panel portion 200.

In some embodiments, due to the difference in the respective sizes of the inner panel portions and the outer panel portions, the inner panel portions may be pushed by inflatable bladder 1100 to fit flush against the outer panel portions. Because the inner circumference of football 1300 is slightly smaller than an outer circumference of football 1300, the larger size of the outer panel portions and the smaller size of the inner panel portions allows the overall stretching of cover 1200 to be minimized or reduced.

For example, as shown in FIG. 15, outer circumferential distance C1 of first outer panel portion 200 on first panel segment 600 is slightly larger than inner circumferential distance C2 of first inner panel portion 210 on first panel segment 600. In some embodiments, outer circumferential distance C1 may be approximately equal to first width W1 of first outer panel portion 200 less the distance corresponding to the stitched peripheral edge 506 along seam 1202 and seam 1204. Similarly, inner circumferential distance C2 may be approximately equal to second width W2 of first inner panel portion 210 less the distance corresponding to the stitched peripheral edge 302 along seam 1202 and seam 1204. Accordingly, when inflatable bladder 1100 is in a fully inflated condition, the larger size of the outer panel portions reduces the need for the outer panel portions to stretch to accommodate inflatable bladder 1100 in the fully inflated condition. With this arrangement, the outer panel portions forming cover 1200 are subject to less variations in size caused by differences in stretch properties of the outer layer material 100 used to make first outer panel portion 200, as well as each other outer panel portion. As a result, the amount of variation between individual footballs produced within the tolerances of the dimensions required by different leagues or agencies may be limited or minimized. In addition, in embodiments where the outer layer material 100 includes a pebbled or textured surface, the reduced amount of stretch applied to the outer panel portions may substantially maintain the quality of the pebbled or textured surface so that grippability of the constructed football is improved.

Figure 16:
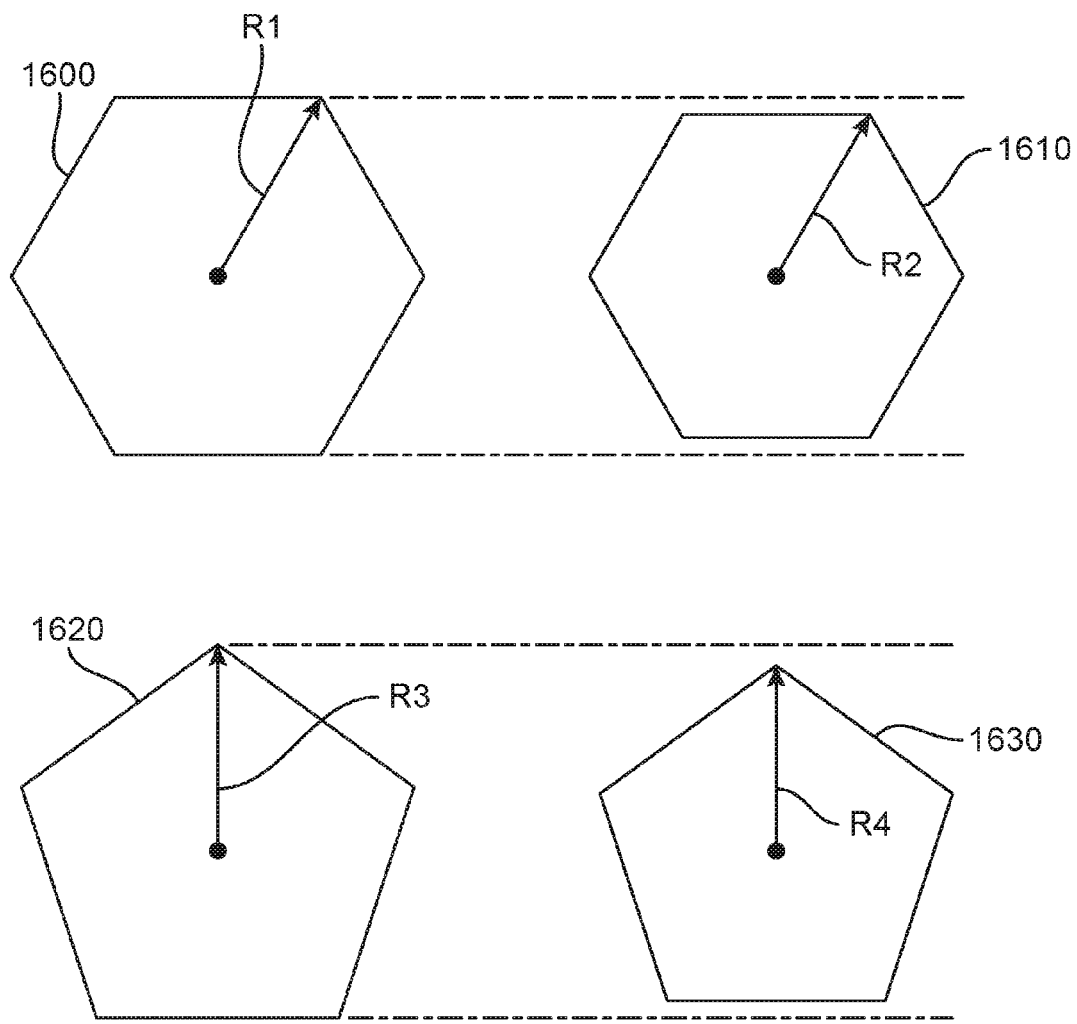
FIG. 16 is a top plan view of exemplary embodiments of panel layers having different sizes for use in constructing a soccer ball.
Figure 17:
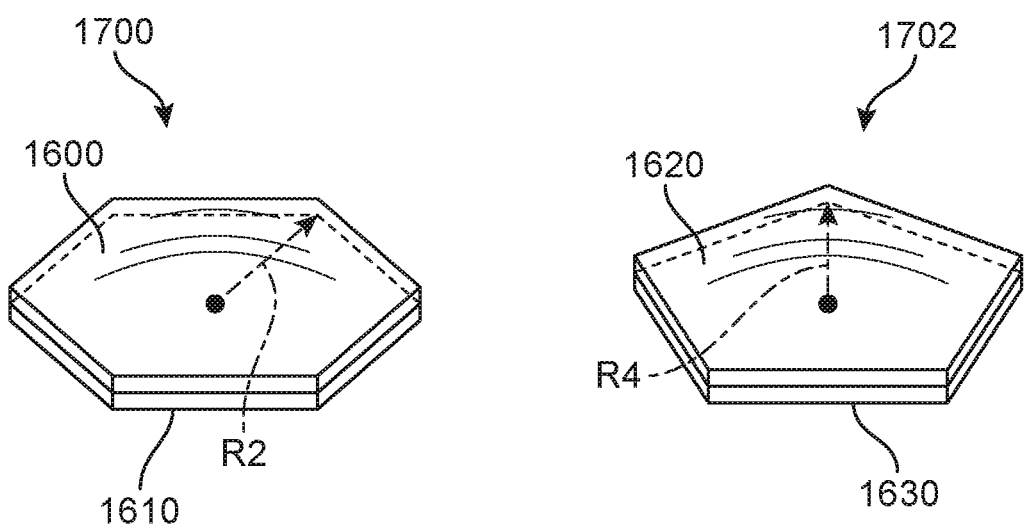
FIG. 17 is an exemplary embodiment of panel segments for a soccer ball.
Figure 18:
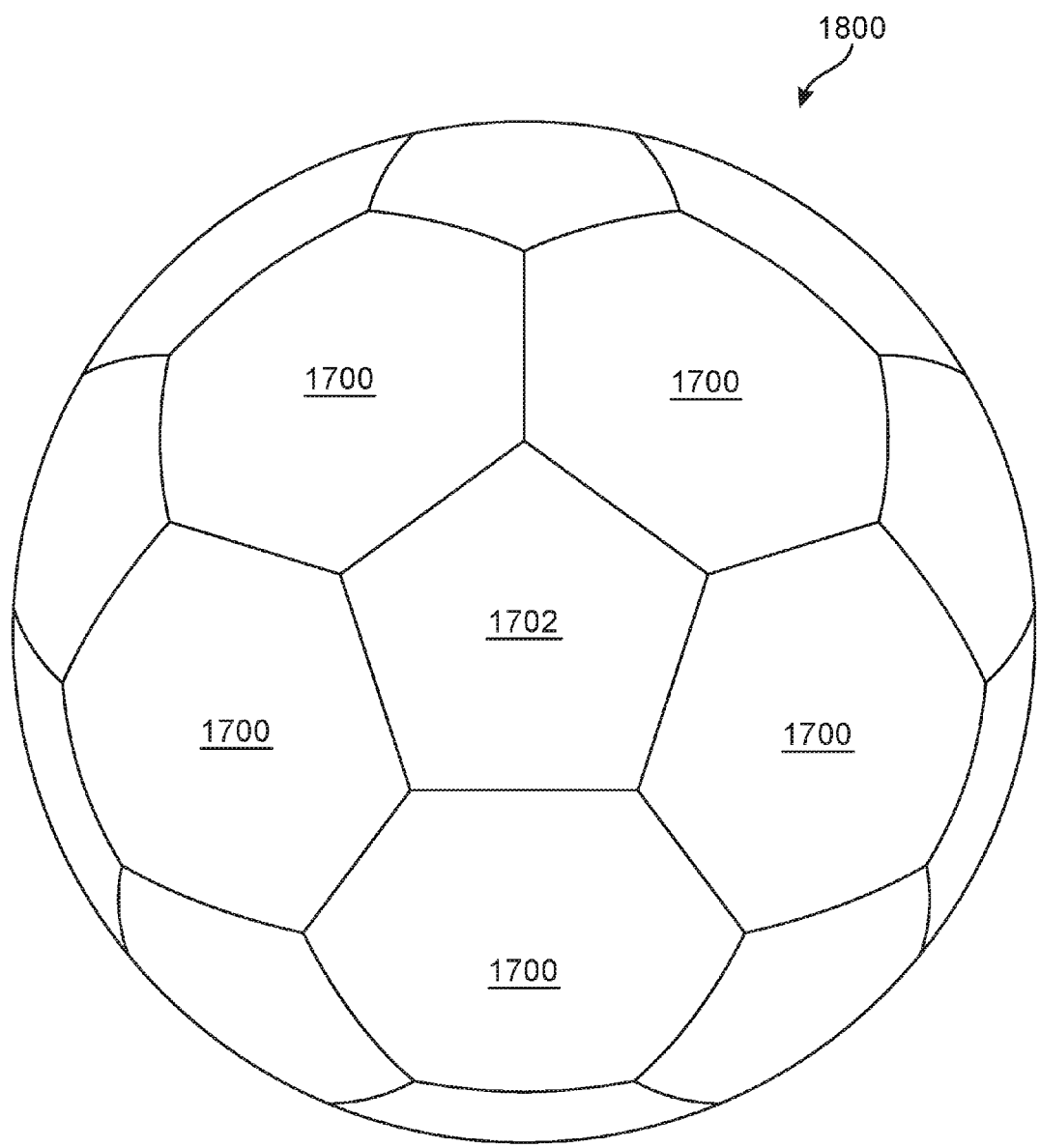
FIG. 18 is an exemplary embodiment of a soccer ball formed of multiple panel segments.

The process of constructing an inflatable game ball using panel portions having different sizes has been described above in reference to constructing a football. However, substantially similar principles may be applied to the construction of any inflatable game ball. Accordingly, FIGS. 16 through 18 illustrate a process of constructing an inflatable game ball in the form of a soccer ball made using the exemplary process described above with reference to FIGS. 1 through 15. Similar principles also may be applied to the construction of other inflatable game balls, including basketballs, volleyballs, and other game balls having a cover and inflatable bladder.

In some embodiments, an inflatable game ball having multiple shapes of panel segments may be constructed with one or more of the panels having different sizes according to the process described above. In an exemplary embodiment, an inflatable game ball in the form of a soccer ball may be constructed using panel segments that have at least two different shapes. Referring now to FIG. 16, in some embodiments, a cover for a soccer ball may be constructed with at least two different shaped panel segments, including a first shape that is hexagonal and a second shape that is pentagonal. In this embodiment, hexagonal shaped panel portions include a first hexagonal outer panel portion 1600 and a first hexagonal inner panel portion 1610. Similarly, pentagonal shaped panel portions include a first pentagonal outer panel portion 1620 and a first pentagonal inner panel portion 1630.

In an exemplary embodiment, each of first hexagonal outer panel portion 1600 and first pentagonal outer panel portion 1620 may be cut or removed from an outer layer material that includes any suitable materials disclosed above for outer layer material 100. In one embodiment, the outer layer material used to form first hexagonal outer panel portion 1600 and first pentagonal outer panel portion 1620 may be a natural or synthetic leather material. In another embodiment, the outer layer material may include felt, wool, or similar materials suitable for indoor soccer ball construction. Similarly, each of first hexagonal inner panel portion 1610 and first pentagonal inner panel portion 1630 may be cut or removed from an inner layer material that includes any suitable materials disclosed above for inner layer material 110. In one embodiment, the inner layer material used to form first hexagonal inner panel portion 1610 and first pentagonal inner panel portion 1630 may be one or more of a polyester, nylon, or cotton fabric.

According to the principles of the construction process described herein, each of the inner layer panel portions may have a substantially similar shape as the outer layer panel portions, but may be a different size. In an exemplary embodiment, the inner layer panel portions may be smaller than the respective outer layer panel portions. As shown in FIG. 16, first hexagonal outer panel portion 1600 may be associated with a size defined by a first radius R1 from a centerpoint to each of the vertices of the hexagon. Simiarly, first hexagonal inner panel portion 1610 may be associated with a size defined by a second radius R2 from a centerpoint to each of the vertices of the hexagon. In an exemplary embodiment, first radius R1 may be larger than second radius R2 such that first hexagonal inner panel portion 1610 is smaller than first hexagonal outer panel portion 1600.

In one embodiment, the pentagonal shaped panel portions may have a similar construction. As shown in FIG. 16, first pentagonal outer panel portion 1620 may be associated with a size defined by a third radius R3 from a centerpoint to each of the vertices of the pentagon. Simiarly, first pentagonal inner panel portion 1630 may be associated with a size defined by a fourth radius R4 from a centerpoint to each of the vertices of the pentagon. In an exemplary embodiment, third radius R3 may be larger than fourth radius R4 such that first pentagonal inner panel portion 1630 is smaller than first pentagonal outer panel portion 1620.

In some cases, the differences in size between each of the panel layer portions may be substantially uniform around the entire perimeter of the respective hexagonal shaped panel layer portions and/or pentagonal shaped panel layer portions. In other cases, the differences in size between each of the panel layer portions may vary along different portions of the perimeter of the panel layer portions, similar to the panel layer portions described above in reference to FIG. 3B. In still other cases, a combination of uniformly different sizes and varying different sizes of panel layer portions may be used for various panel segments used to form the cover of the soccer ball. With this arrangement, the amount of variation or reduction in stretch of the cover of the soccer ball may be controlled to different degrees at specific portions of the cover.

In some embodiments, panel segments used to construct a cover for a soccer ball may be formed using a substantially similar process as described in FIGS. 4 through 7 above. In other embodiments, one or more alignment guides may be used in a substantially similar manner as described in FIGS. 9 and 10.

FIG. 17 illustrates an exemplary embodiment of forming a first hexagonal panel segment 1700 by joining first hexagonal outer panel portion 1600 and first hexagonal inner panel portion 1610 along their respective peripheral edges. As shown in FIG. 17, each of the vertices of first hexagonal outer panel portion 1600 are aligned with and joined to each of the vertices of first hexagonal inner panel portion 1610 and the panel portions are joined along the perimeter of their respective peripheral edges between the vertices. With this configuration, the smaller size of first hexagonal inner panel portion 1610 causes first hexagonal outer panel portion 1600 to bulge outward causing the exterior surface to have a substantially convex surface.

FIG. 17 also illustrates an exemplary embodiment of forming a first pentagonal panel segment 1702 by joining first pentagonal outer panel portion 1620 and first pentagonal inner panel portion 1630 along their respective peripheral edges. In this embodiment, each of the vertices of first pentagonal outer panel portion 1620 are aligned with and joined to each of the vertices of first pentagonal inner panel portion 1630 and the panel portions are joined along the perimeter of their respective peripheral edges between the vertices. With this configuration, the smaller size of first pentagonal inner panel portion 1630 causes first pentagonal outer panel portion 1620 to bulge outward causing the exterior surface to have a substantially convex surface.

In an exemplary embodiment, the peripheral edges of the respective panel portions of first hexagonal panel segment 1700 and/or first pentagonal panel segment 1702 may be joined using adhesive or any other suitable attachment mechanism described above in regards to first panel segment 600.

In some embodiments, a cover for an inflatable game ball in the form of a soccer ball may be formed by attaching multiple hexagonal shaped panel segments and pentagonal shaped panel segments in a predetermined truncated icosahedron shape. In various embodiments, the arrangement of individual panel segments of different shapes used to form the cover may vary depending on the type of soccer ball being constructed. For example, a cover for a 32-panel soccer ball may include 20 hexagonal shaped panel segments and 12 pentagonal shaped panel segments. Other cover panel arrangements that may be used to construct a soccer ball include an 18-panel and a 26-panel construction. In still other embodiments, different cover panel arrangements for inflatable game balls using a larger or smaller number of panel segments may be provided.

Referring now to FIG. 18, a soccer ball 1800 may be formed with a cover having a 32-panel construction. In an exemplary embodiment, one or more of the panel segments forming the cover of soccer ball 1800 may include first hexagonal panel segment 1700 and/or first pentagonal panel segment 1702 made using the process described herein. In this embodiment, first pentagonal panel segment 1702 may be surrounded by and attached to five substantially similar panel segments as first hexagonal panel segment 1700. Similar groupings of substantially similar panel segments may extend around soccer ball 1800 to form the cover. Each of the panel segments may be attached to adjacent panel segments using stitching, bonding, adhesive, or any other suitable attachment mechanisms described herein or known in the art. With this arrangement, the outer panel portions of each panel segment forming the cover of soccer ball 1800 are subject to less variation in size caused by differences in stretch properties of the outer layer material used to make the outer panel portions. As a result, the amount of variation between individual soccer balls produced within the tolerances of the dimensions required by different leagues or agencies may be limited or minimized.

Additionally, in some embodiments, panel segments using the process described herein may be combined with panel segments made using conventional construction processes. With this arrangement, some portions of an inflatable game ball may be provided with tighter construction tolerances and less variation in stretch properties, while other portions including the convention panel segments may be allowed to vary and stretch in a conventional manner.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. An inflatable game ball comprising:
    a cover formed from a plurality of panel segments attached along peripheral edges, wherein each panel segment of the cover includes:
        an outer panel portion having a first shape and a first size; and
        an inner panel portion having the first shape and a second size, the second size of the inner panel portion being smaller than the first size of the outer panel portion, and wherein the outer panel portion is joined with the inner panel portion such that a peripheral edge of the outer panel portion is aligned and parallel with a peripheral edge of the inner panel portion; and
    an inflatable bladder disposed within the cover, the inflatable bladder being configured to move between a deflated condition and a fully inflated condition, wherein:
        when the inflatable bladder is in the deflated condition, an interior surface of the outer panel portions of the cover is separated a first distance apart from a top surface of the inner panel portions of the cover, and
        when the inflatable bladder is in the fully inflated condition, the interior surface of the outer panel portions of the cover is in contact with the top surface of the inner panel portions of the cover.

2. The inflatable game ball according to claim 1,
    wherein the first size is associated with a first length in a longitudinal direction along a major axis of the outer panel portion and a first width in a lateral direction along a minor axis of the outer panel portion;
    wherein the second size is associated with a second length in the longitudinal direction along a major axis of the inner panel portion and a second width in the lateral direction along a minor axis of the inner panel portion; and
    wherein the second length is smaller than the first length and the second width is smaller than the first width.

3. The inflatable game ball according to claim 2, wherein an outer circumference of each of the panel segments of the cover is approximately equal to the first width of the outer panel portion less a distance associated with a portion of the peripheral edge joined to the inner panel portion.

4. The inflatable game ball according to claim 2, wherein an inner circumference of each of the panel segments of the cover is approximately equal to the second width of the inner panel portion less a distance associated with a portion of the peripheral edge joined to the outer panel portion.

5. The inflatable game ball according to claim 2, wherein a difference between the first length and the second length is substantially equal to a difference between the first width and the second width.

6. The inflatable game ball according to claim 2, wherein a difference between the first length and the second length is smaller than a difference between the first width and the second width.

7. The inflatable game ball according to claim 1, wherein the outer panel portion is formed from a first material and the inner panel portion is formed from a second material, different from the first material.

8. The inflatable game ball according to claim 7, wherein the first material includes leather and the second material includes a flexible fabric.

9. The inflatable game ball according to claim 1, wherein, when the inflatable bladder is in the deflated condition, the outer panel portion forms a concave surface that is disposed the first distance from the inner panel portion.

10. The inflatable game ball according to claim 1, wherein each of the outer panel portions are attached to the inner panel portions with an adhesive.

11. The inflatable game ball according to claim 10, wherein the panel segments of the cover are attached to each other via stitching, such that a portion of the stitching overlaps the adhesive.

12. An inflatable game ball comprising:
a cover formed from a plurality of panel segments attached along peripheral edges, wherein each panel segment of the cover includes:
an outer panel portion having a first shape and a first size, wherein the outer panel portion is formed from a first material; and
an inner panel portion having the first shape and a second size, the second size of the inner panel portion being smaller than the first size of the outer panel portion, wherein the inner panel portion is formed from a second material, different from the first material;
an adhesive joining the outer panel portion to the inner panel portion such that a peripheral edge of the outer panel portion is aligned and parallel with a peripheral edge of the inner panel portion; and
an inflatable bladder disposed within the cover, the inflatable bladder being configured to move between a deflated condition and a fully inflated condition, wherein:
when the inflatable bladder is in the deflated condition, an interior surface of the outer panel portions of the cover is separated a first distance apart from a top surface of the inner panel portions of the cover, and
when the inflatable bladder is in the fully inflated condition, the interior surface of the outer panel portions of the cover is in contact with the top surface of the inner panel portions of the cover.

13. The inflatable game ball according to claim 12, wherein the first material includes leather and the second material includes a flexible fabric.

\* \* \* \* \*